(12) United States Patent
Engel et al.

(10) Patent No.: US 11,004,030 B2
(45) Date of Patent: May 11, 2021

(54) SYSTEMS AND METHODS TO PROCESS PRODUCT RETURN REQUESTS

(71) Applicant: ATC Logistic & Electronics, Inc., Fort Worth, TX (US)

(72) Inventors: Randy W. Engel, Fort Worth, TX (US); Edgar A. Grigalis, Fort Worth, TX (US)

(73) Assignee: FedEx Supply Chain Logistics & Electronics, Inc., Fort Worth, TX (US)

( * ) Notice: Subject to any disclaimer, the term of this patent is extended or adjusted under 35 U.S.C. 154(b) by 297 days.

(21) Appl. No.: 15/355,991

(22) Filed: Nov. 18, 2016

(65) Prior Publication Data

US 2018/0144301 A1 May 24, 2018

(51) Int. Cl.
  *G06Q 10/08* (2012.01)
  *G06Q 20/00* (2012.01)
  *G06Q 20/08* (2012.01)

(52) U.S. Cl.
  CPC ......... *G06Q 10/0837* (2013.01); *G06Q 20/00* (2013.01); *G06Q 20/085* (2013.01)

(58) Field of Classification Search
  CPC ....................... G06Q 10/0837; G06Q 30/0278
  See application file for complete search history.

(56) References Cited

U.S. PATENT DOCUMENTS

| | | | | |
|---|---|---|---|---|
| 2003/0120369 A1* | 6/2003 | Takaoka | .......... | G06Q 10/06 700/95 |
| 2003/0184306 A1* | 10/2003 | Bertness | .......... | G01R 31/3648 324/426 |
| 2004/0172260 A1* | 9/2004 | Junger | .......... | G06Q 10/0833 705/21 |
| 2007/0156439 A1* | 7/2007 | Fyda | .......... | G06Q 10/06 705/308 |
| 2009/0048934 A1* | 2/2009 | Haddad | .......... | G06Q 20/20 705/17 |
| 2009/0061839 A1* | 3/2009 | Zimmerman | .......... | H04W 8/265 455/419 |
| 2010/0228676 A1* | 9/2010 | Librizzi | .......... | G06Q 10/00 705/306 |
| 2014/0333761 A1* | 11/2014 | Porter | .......... | G06Q 30/06 348/135 |
| 2015/0221021 A1* | 8/2015 | Shakes | .......... | G06Q 10/08 705/26.81 |
| 2016/0125548 A1* | 5/2016 | Bowles | .......... | G06Q 10/30 705/4 |

OTHER PUBLICATIONS

"Offload your old devices with EcoATM" Scott Matteson, Apr. 21, 2015,https://www.techrepublic.com/article/offload-your-old-devices-with-ecoatm/ (Year: 2015).*

* cited by examiner

*Primary Examiner* — Kevin H Flynn
*Assistant Examiner* — Ismail A Manejwala
(74) *Attorney, Agent, or Firm* — McGuireWoods LLP

(57) ABSTRACT

Disclosed herein are embodiments of systems, methods, and computer program products to process product return requests. In one embodiment, the method includes performing image analysis on the electronic device; retrieving business rules governing the warranty plan of a service provider associated with the electronic device; and determining whether the electronic device is accepted under the warranty plan based on the business rules and the image analysis associated with the electronic device.

15 Claims, 9 Drawing Sheets

SYSTEMS AND METHODS TO PROCESS PRODUCT RETURN REQUESTS

BACKGROUND

The present disclosure relates generally to systems and methods to process product return requests.

The use and development of electronic devices have grown nearly exponentially in recent years. The growth is fueled by the telecommunication, media, and computer markets. As a result, more people than ever are buying and using electronic devices. Correspondingly, the number of returns, repairs, exchanges, refurbishments, warranty claims, and similar procedures (collectively herein referred to as product returns) are at record levels.

Often times, when a product is submitted for product return, the product is generally shipped to a facility, and other than some general tracking or shipping information, the process is very nontransparent to the consumer and does not provide any assurances to the consumer that the product is being processed or handled correctly. Although, some entities responsible for transporting the user's product and/or for servicing the user's product provide basic status updates of the product as the product is transported from the user to the facility and back to the user, only basic indications of the status of the product are monitored by said entities. Data, which may be utilized to accurately service the product, to minimize product loss, and to provide the user and the entities with real-time status updates of the product are not adequately monitored and analyzed.

BRIEF SUMMARY OF THE DISCLOSED EMBODIMENTS

The disclosed embodiments provide systems and methods to process product return requests. In accordance with one embodiment, a method to process a product return is provided. The method includes receiving instructions to process a first product return request for an electronic device. The method also includes performing an image analysis on the electronic device. The method further includes obtaining business rules governing the first product return request. The method further includes determining whether to accept the first product return request based on the business rules and the image analysis associated with the electronic device.

In accordance with another illustrative embodiment, a system for processing product return requests is provided. The system includes at least one image capturing device operable to capture images of an electronic device. The system also includes at least one image storing device operable to store stock images of the electronic device. The system further includes a storage unit storing business rules governing a warranty plan of a service provider associated with the electronic device. The system further includes at least one instruction processing device operable to perform image analysis on the electronic device, obtain a set of the business rules governing the warranty plan of the service provider associated with the electronic device based on the images of the electronic device, and determine whether the electronic device is accepted under the warranty plan based on the business rules and the image analysis associated with the electronic device.

In accordance with a further illustrative embodiment, a computer program product is also provided. The computer program product includes a non-transitory computer usable medium having a computer readable program code embodied therein, said computer readable program code adapted to be executed to perform image analysis on an electronic device. The code is also adapted to be executed to retrieve business rules governing a warranty plan of a service provider associated with the electronic device. The code is further adapted to be executed to update the business rules governing the warranty plan of the service provider based on a set of conditions. The code is further adapted to be executed to determine whether the electronic device is accepted under the warranty plan based on the business rules and the image analysis associated with the electronic device.

Additional details of the disclosed embodiments are provided below in the detailed description and the corresponding drawings.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, and electrical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The following written description discloses an innovative approach for providing a transparent process for handling returns, repairs, warranty claims, and other electronic device processing. For example, in one embodiment, the disclosed embodiments include an automated product management system operable to visually track a processing of electronic devices that includes at least one image capturing device operable to capture images of an electronic device beginning from a start processing point at a facility and until an end processing point at the facility; at least one image storing device operable to store the images of the electronic device; and at least one instruction processing device operable to retrieve the images of the electronic device using an identifier associated with the electronic device.

Another embodiment includes a loss prevention tracking system comprising: at least one image capturing device operable to capture images of an electronic device beginning from a start processing point at a facility and until an end processing point at the facility; at least one image storing device operable to store the images of the electronic device; and at least one instruction processing device operable to provide an alert in response to a determination that the electronic device is missing between the start processing point and the end processing point, store tracking data associated with the electronic device with tracking data associated with other electronic devices into a compiled set of tracking data, and perform trend analysis on the compiled set of tracking data to identify a source of loss.

Still, another disclosed embodiment includes an automated method for processing a product return request for an electronic device, the automated method comprising: performing image analysis on the electronic device; obtaining business rules governing the product return request; and determining whether to accept the product return request based on the business rules and the image analysis associated with the electronic device.

Figure 1:
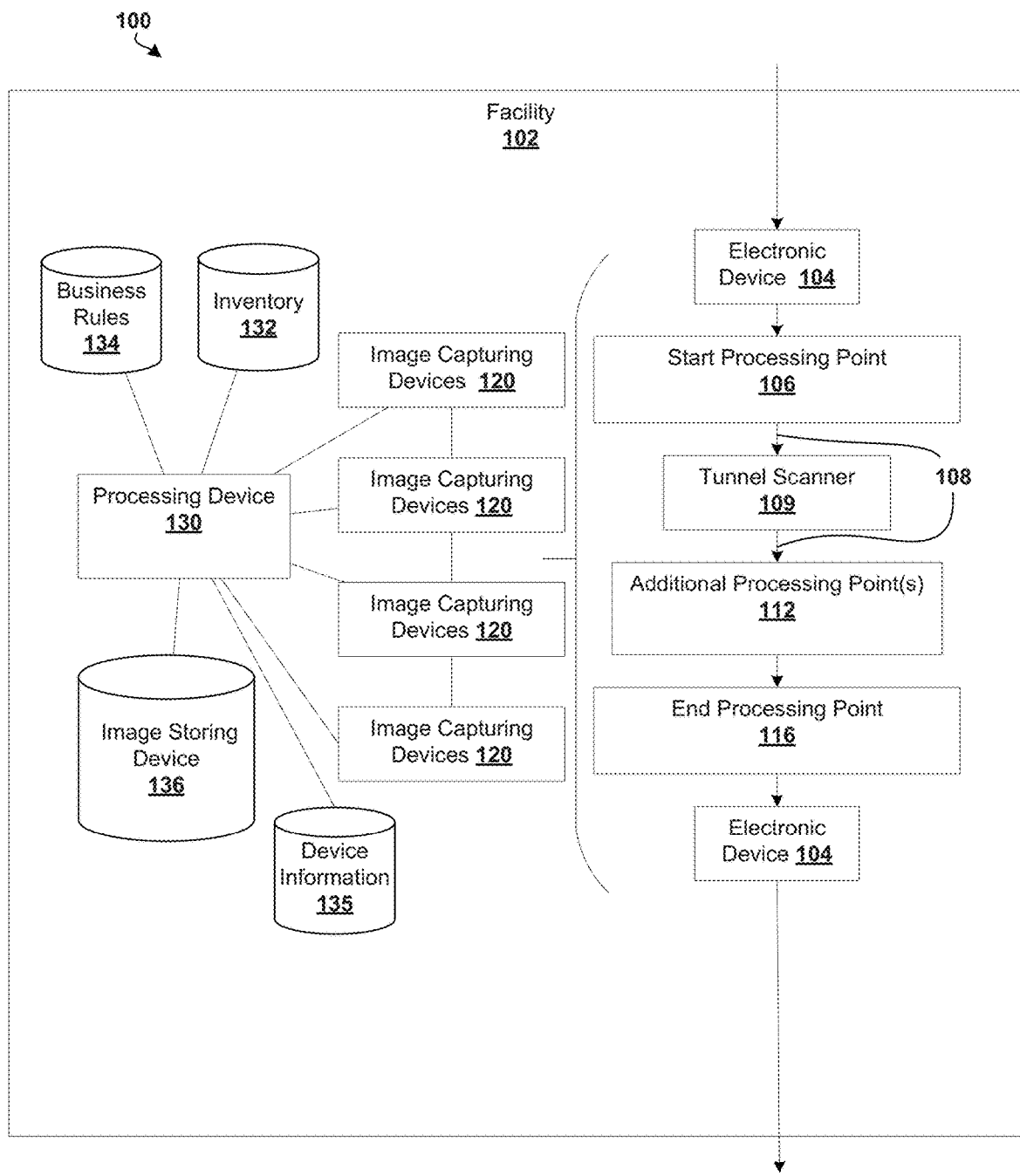
FIG. 1 is a diagram depicting an example of an automated product management system for processing and for tracking product returns according to a disclosed embodiment.

Referring now to the drawings, FIG. 1 is a diagram depicting an example of an automated product management system 100 for processing and for tracking product returns according to a disclosed embodiment. As defined herein, a product return includes any return of an existing product. The product return may be a return of the existing product for monetary consideration, return of the existing product for repair of the existing product, return of the existing product for exchange, as well as other available programs where the existing product is returned to a facility, such as facility 102. In the depicted embodiment, the automated product management system 100 includes a plurality of devices such as one or more image capturing devices 120 at the facility 102. As used herein, the term image and images refer to still images and/or video images. Non-limiting examples of image capturing devices 120 include video cameras, still image cameras, x-ray scanners, tunnel scanners, and image or vision sensors. The image capturing devices 120 may be stationary, rotatable, moving, and/or aerial mounted such as, but not limited to, on a drone. In a preferred embodiment, the image capturing devices 120 are operable to capture high definition images that provide a high degree of detail in an image or video. For example, in some embodiments, the image capturing devices 120 may capture images that enable minute details of an electronic device to be viewed when the captured image is zoomed in on that otherwise would be difficult or not possible to be seen by the naked eye.

The facility 102 is any type of location such as a warehouse, a commercial building, a kiosk located in a commercial, residential, industrial, transportation, or governmental building, or a similar location that receives, assembles, repairs, evaluates, and/or processes devices that are returned by a consumer, product manufacturer, and/or a service provider such as, but not limited to, a telecommunication or media service provider. For example, as depicted in FIG. 1, an electronic device 104 may be received at the facility 102 for a warranty repair claim, a paid repair request, refurbishment, and/or to be evaluated for as part of a buyback program and/or upgrade program. The electronic device 104 may be any type of device such as, consumer electronics including telephones, watches, set-top boxes, computers, tablet devices, monitors, televisions, projectors, cameras, optical head-mounted displays such as virtual-reality headsets, specially designed glasses, as well as other types of electronic devices disclosed herein. The electronic device 104 may be received in individual packaging and/or in bulk packaging.

In the depicted embodiment, a processing device 130, such as a warehouse management system (WMS) is in wired or wireless communication with the one or more image capturing devices 120 to receive captured images of an electronic device such as the electronic device 104. In one embodiment, the captured images of the electronic device 104 are stored in an image storing device 136. Image storing device 136 may be any type of data storage device including but not limited to a database/database server, an internal or external hard drive, and/or a flash memory drive.

Although the processing device 130 and depicted databases are shown as being located within the facility 102, in some embodiments, the processing device 130 and/or one or more of the depicted databases may be remotely located from the facility 102. In such embodiments, the processing device 130 is operable to receive and/or retrieve the captured images of the electronic device 104 over a communication network that extends beyond the facility 102 such as, but not limited to, a local area network, a wide area network, a metro area network, the Internet, an intranet, a mobile cellular or data network, a cloud based network, or any other network operable to transmit data, such as, but not limited to, the captured images of the electronic devices to the processing device 130.

Additionally, in one embodiment, the processing device 130 is operable to execute one or more software application that supports the day-to-day operations at the facility 102. For example, the processing device 130 may execute programs to facilitate centralized management of tasks such as tracking inventory levels and stock locations. For instance, in one embodiment, the processing device 130 is operable to communicate with an inventory database 132 to track inventory levels such as the number of a particular type or model of electronic devices that are available in inventory.

In some embodiments, the processing device 130 receives a request to process the electronic device 104 for product return (a product return request). As defined herein, the product return request may include a request to process a warranty claim, a request to repair the electronic device 104, a request to replace the electronic device 104, a request to trade-in the electronic device 104, a request to dispose the electronic device 104, as well as other requests disclosed herein to service the electronic device 104. In such embodiments, the processing device 130 is operable to access a device information database 135 containing information related to the electronic device 104. Information stored in the device information database 135 includes manufacturing specification of the electronic device 104, information related to the marketing condition of the electronic device 104, customer information of the customer of the electronic device 104, vendor information of the vendor of the electronic device 104, as well as other quantifiable information about the electronic device 104.

The processing device 130 is further operable to access a business rules database 134 containing business rules for processing the product return to obtain a set of business rules that govern whether to process the product return request. The business rules for processing the product return request include business rules based on a device condition of the electronic device 104. As defined herein, the device condition includes one or more quantifiable attributes of the electronic device, such as the physical condition of the electronic device 104, the age of the electronic device 104, hardware specifications of the electronic device 104, other physical attributes of the electronic device 104, as well as other quantifiable attributes. The business rules for processing the product return request also includes business rules based on the present market condition of the electronic device 104, such as the current cost to service the electronic device 104, availability of replacement devices and parts, on-site inventory, as well as other business rules associated with the present market condition of the electronic device 104. The business rules for processing the product return request further includes business rules based on a return plan of the electronic device 104, such as whether the electronic device 104 is within a warranty period, the scope of the warranty, availability of additional third party coverages, as well as other business rules associated with the available return plan of the electronic device 104. The business rules for processing the product return request further includes business rules based on vendor conditions associated with the electronic device 104, such as vendor specified conditions discussed herein. Additional business rules for processing the product return request are discussed in further detail in the paragraphs below and are illustrated in at least FIG. 3.

The processing device 130 then determines whether to process the product return request based on the set of obtained business rules. For example, the business rules may specify that the electronic device 104 may be returned for a full refund if the electronic device 104 was purchased by the customer within one month, has no visual damage to the display screen of the electronic device 104, and is within the warranty period to replace the electronic device 104. Additional descriptions of the foregoing process to determine whether to process product return requests are provided herein and are illustrated in at least FIG. 3.

The product management system 100 is operable to track electronic devices, such as the electronic device 104 while the product return requests of the electronic devices are processed. As depicted in FIG. 1, the electronic device 104 is first received at a start processing point 106 at the facility 102. The start processing point 106 may vary based on different facilities and different embodiments. For example, in one embodiment, the start processing point 106 may be a package receiving area and/or workstation at the facility 102. In another embodiment, the start processing point 106 may be the entrance of the facility, the dock loading/receiving area, and/or the entrance to the parking lot of the facility 102. In accordance with the disclosed embodiments, the one or more image capturing devices 120 are operable to capture images of the electronic device 104 beginning from the start processing point 106. In one embodiment, the one or more image capturing devices 120 are operable to capture images of a condition of a package in which the electronic device 104 is received in at the start processing point to provide visual proof or evidence of a condition that the package is when it is received that the facility 102. In addition, the one or more image capturing devices 120 are operable to capture images of the condition of the electronic device 104 inside the package when the package is first opened to provide visual proof of the device condition of the electronic device 104 inside the package.

Further, in some embodiments, the one or more image capturing devices 120 are operable to capture images of the electronic device 104 as it is being removed or unpackaged from the package that it is received in. In further embodiments, the image capturing devices 120 include one or more sensor components operable to detect whether the electronic device 104 is packaged without opening the package. In one of such embodiments, the electronic device 104 contains a radio frequency identification (RFID) tag containing an identification of the electronic device 104, and one of the one or more sensor components is a RFID reader operable to communicate with the RFID tag to determine the identification of the electronic device 104. In another one of such embodiments, the electronic device 104 includes a Near Field Communication (NFC) containing the identification of the electronic device 104, and one of the one or more sensor components is a NFC reader operable to communicate with the NFC tag to determine the identification of the electronic device 104.

Additionally, in some embodiments, the one or more image capturing devices 120 are operable to capture images of the electronic device 104 as it is being analyzed or processed. For example, in some embodiments, the one or more image capturing devices 120 are operable to capture detail images of a shipping label, an International Mobile Station Equipment Identity (IMEI) label, a model number and/or serial number of the electronic device 104, a condition of a battery, a model and/or serial number of the battery, a display screen, connector ports such as charging ports, audio ports, buttons on the electronic device 104, and other details of the electronic device 104. In one embodiment, the processing device 130 is operable to analyze the detail images to determine, identify, or flag any damage or possibility of damage to the electronic device 104. For example, in one embodiment, the processing device 130 may determine that a connector pin or connector port is damaged, and/or that there is a minor scratch on the display screen, and/or that the battery is a generic replacement.

The above process may occur at the start processing point 106 or at additional processing points 112 within the facility 102. For example, in one embodiment, the electronic device 104 may be received at the start processing point 106, where it is unpackaged, and then sent along a conveyor belt or processing line 108 to the additional processing points 112 until it reaches an end processing point 116. Similar to the start processing point 106, the end processing point 116 may vary within different facilities and/or embodiments. For instance, in one embodiment, the end processing point 116 may be a workstation at which the final assembly, product assessment, and/or repair of the electronic device 104 is performed. In other embodiments, the end processing point 116 may be a workstation at which the electronic device 104 is packaged for shipping. Still, in some embodiments, the end processing point 116 may be an exit of the facility 102, a loading dock, or an exit gate of the parking lot of the facility 102.

In some embodiments, additional image capturing devices may be employed between the additional processing points 112 along the processing line 108. For example, in one embodiment, a tunnel scanner 109 may be deployed along the processing line 108. In one embodiment, the tunnel scanner 109 is a device that provides at least a 180 degree scan of the electronic device 104 passing through it. In one embodiment, the automated product management system 100 is operable to rotate the electronic device 104 to provide a 360 degree scan of the electronic device 104. For example, a mechanical arm or mechanism may be employed to flip the electronic device 104 over and/or grasp the electronic device 104 while the electronic device 104 is being rotated during an image scan.

In one embodiment, the processing device 130 is operable to analyze these images to detect any deformities associated with the electronic device 104. In some embodiments, the automated product management system 100 may also include one or more weight measuring devices for determining the weight of the electronic device 104 and/or a package containing the electronic device 104. For instance, in one embodiment, the automated product management system 100 is operable to generate an alert if the difference between the weight of the package containing the electronic device 104 measured by one measuring device exceeds a difference threshold when compared to a second weight measured by a second measuring device. The difference in weight may indicate that an item has been removed from the package or has not been properly replaced. Also a difference in weight measurements or expected weight measurement may indicate that a particular part or parts are missing. This may be from the customer or consumer returning an incomplete product or package or may be from an intentional or unintentional component being missing in the returned package or product.

In some embodiments, the automated product management system 100 is operable to determine discrepancies between the electronic device 104 and the manufacturing specification of the electronic device 104 (device discrepancy). Examples of device discrepancy include discrepancy in the weight, dimensions, material composition, components, as well as other quantifiable measurements of the specification of the electronic device 104. The device discrepancy of the electronic device 104 may be caused by damaged components, missing components, presence of unauthorized components, and any combination of the foregoing factors. In one of such embodiments, the automated product management system 100 calibrates the various weight measuring devices and accounts for any differences in weight measurements caused by any inaccuracies of the weight measuring devices. Additionally, in one embodiment, the weight measuring devices may be calibrated using a gold standard weight device for each model of electronic devices that are processed by the automated product management system 100. In one embodiment, for each model of electronic devices, the automated product management system 100 is operable to record the weight of the gold standard weight device as a complete unit and also with various components missing from the gold standard weight device. For example, in one embodiment, the automated product management system 100 is operable to record one or more of the following weights: gold standard weight device with and without a battery, gold standard weight device with various size data storage capacity, gold standard weight device with or without a subscriber identity module (sim) card, gold standard weight device within standard/OEM packaging, and one or more various combinations of the above.

In one embodiment, the automated product management system 100 is operable to determine or identify what component or components of an electronic device such as the electronic device 104 may be missing based on a weight discrepancy. For example, an alert may be generated to notify an operator at the facility 102 that a battery may be missing from the device and/or the storage capacity of the device may be wrong. An alert may also be generated if a weight discrepancy exceeds a particular weight threshold value. For example, if a package containing the electronic device weighs more or less than an expected weight by more than the weight discrepancy threshold value (e.g., a weight discrepancy beyond 2 lbs. may indicate that the package is empty or contains a foreign substance to fake the weight), an alert is generated or the package may be rerouted to a particular area for further examination.

In another one of such embodiments, the automated product management system 100 performs an image analysis of the electronic device 104 to determine the presence of device discrepancy. More particularly, the automated product management system 100 operates the image capturing devices 120 or other sensors to determine missing components. In one of such embodiments, the automated product management system 100 operates the image capturing devices 120 to obtain a three-dimensional representation (actual 3D representation) of the electronic device 104. The automated product management system 100 also has access to a virtual three-dimensional representation (virtual 3D representation) of the electronic device 104 that satisfies the product specification of the electronic device 104. The automated product management system 100 is further operable to compare the actual 3D representation with the virtual 3D representation to determine discrepancies between the virtual 3D representation and the actual 3D representation. For example, the product management system 100 is operable to compare the contours of a display screen of the actual 3D representation of the electronic device 104 with the contours of the display screen of the virtual 3D representation to determine the presence of damage to the display screen, the amount of damage to the display screen, the location of the damage, as well as other discrepancies between the display screen of the actual 3D representation and the display screen of the virtual 3D representation.

Certain modifications to the electronic device 104 may not be visible or detectable based on an image analysis of the electronic device 104. In one embodiment, the automated product management system 100 is operable to communicate with the electronic device 104 to determine which hardware components are installed on the electronic device 104. In another embodiment, the automated product management system 100 is operable to detect and to determine which hardware components are installed on the electronic device 104. The automated product management system 100 accesses to the hardware specifications of the electronic device 104 to determine the components installed by the manufacturer or authorized by the manufacturer (collectively authorized components) of the electronic device 104. The automated product management system 100 then compares the components installed on the electronic device 104 with the authorized components to determine whether any authorized component is missing from the electronic device 104 and/or the presence of un-authorized components.

In some embodiments, the automated product management system 100, upon determining a device discrepancy, is further operable to generate an indication of the device discrepancy for the operator. The indication may provide additional details regarding the discrepancy as well as instructions for a manual verification of the discrepancy. The operator may then manually verify the discrepancy. In some embodiments, the one or more image capturing devices 120 are operable to capture images of the electronic device continuously from the start processing point 106 to the end processing point 116. For example, in one embodiment, the start processing point 106 is when the electronic device 104 is received at the facility 102 and the end processing point 116 is when the electronic device 104 departs the facility 102. In this embodiment, the one or more image capturing devices 120 is operable to capture images of the electronic device 104 continuously upon receipt at the facility 102 and until the electronic device 104 departs the facility 102. This embodiment provides a complete visual log of the electronic device 104 while being processed at the facility 102.

In another embodiment, the start processing point 106 is a first processing workstation and the end processing point 116 is last processing workstation. In this embodiment, the automated product management system 100 is operable to utilize the one or more image capturing devices 120 to capture images at the first processing workstation, last processing workstation, and one or more processing workstations between the first processing workstation and the last processing workstation. This embodiment provides a visual log of the electronic device 104 at every workstation within the facility 102. Alternatively, in some embodiments, the automated product management system 100 is operable to utilize the one or more image capturing devices 120 to capture images at just certain processing workstations or at randomly selected workstations. For instance, in one embodiment, if from past analysis, certain issues appear to occur at a particular workstation or workstations, the automated product management system 100 is operable to capture images only at those particular workstations. Still, in some embodiments, a location tracking device, such as, but not limited to, a radio-frequency identification (RFID) tag may be employed on the electronic device 104 and/or the package of the electronic device 104 to assist in maintaining a visual tracking of the electronic device 104 and/or package.

Figure 2:
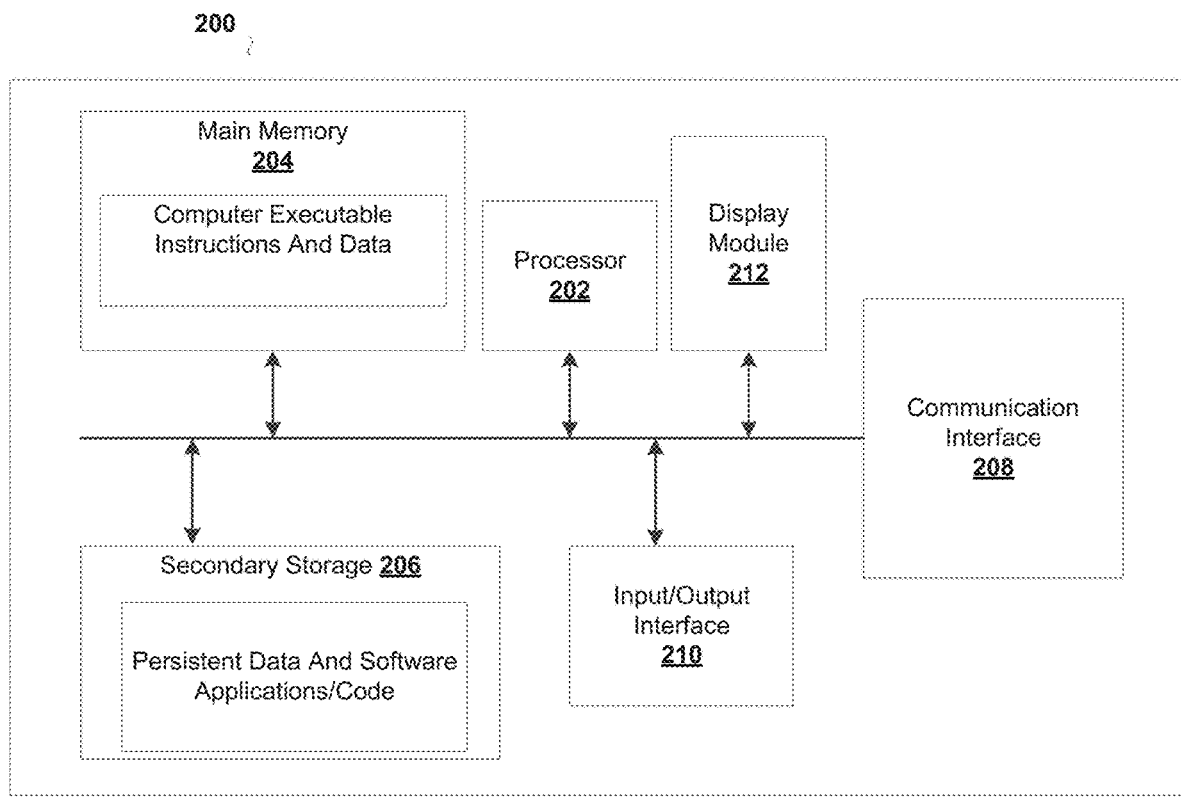
FIG. 2 is a system diagram of a system for processing product returns, visually tracking products, and performing loss prevention processes according to a disclosed embodiment.

FIG. 2 is a system diagram illustrating a system 200 that may be used for processing product returns, visually tracking products during said processing, and/or performing loss prevention processes according to an exemplary embodiment. In certain embodiments, the system 200 is located at the facility 102. In one of such embodiments, the system 200 represents the processing device 130 of the product management system 100. In other embodiments, the system 200 is located off-site relative to the facility 102 and is communicatively connected to the automated product management system 100. For example, in one embodiment, the images captured by the at least one image capturing device 104 may be sent to the system 200 over a secure private network or, in certain embodiments, over a public network such as, but not limited to, the Internet.

In the depicted embodiment, the system 200 includes a processor 202, main memory 204, secondary storage unit 206, an input/output interface module 210, and a communication interface module 208. The processor 202 may be any number of or type of processors operable to execute instructions to perform the features and functions of the disclosed embodiments. The input/output interface module 210 allows the system 200 to receive user input (e.g., keyboard, mouse, touchscreen) and output information to one or more devices such as, but not limited to, printers, electronic displays, external data storage drives, and audio and video components. In some embodiments, the system 200 is operable to provide the information to one or more applications, such as electronic mail applications, short message service (SMS) applications, notification applications, device record management applications, and other applications authorized to store and/or process the information. For example, the information may be provided to an electronic mail application operable to format the information and to transmit the information to an electronic mailbox of an operator at the facility 120. The further embodiments, the system 200 is also operable to provide the information to other systems that are communicatively connected to the system 200 for storage and/or processing by the other systems.

The communication interface module 208 allows the system 200 to communicate data with other devices over a public or private, wired or wireless network. Non-limiting examples of communication types that may be employed include, but not limited to, near field communication, Wi-Fi communication, cellular data communication, or Ethernet communication. In some embodiments, communication between the system 200 and other devices may utilize, but not limited to, a local area network, a wide area network, or the Internet.

The system 200 may optionally include a graphics or display module 212 to provide information for display on an internal or external display device. For instance, the display module 212 may include instructions or hardware for providing touchscreen capabilities for receiving user input via the display device. In certain embodiments, the display module 212 may also include instructions for enabling multi-touch functionalities associated with a display device. In some embodiments, the display module 212 may include its own graphics processor for the processing and rendering of images or videos.

Main memory 204 is volatile memory that stores currently executing or prefetched instructions/data for execution by the processor 202. Secondary storage unit 206 is non-volatile memory. Examples of secondary storage unit 206 may include any type of data storage component such as a hard drive, a flash drive, or memory card. The secondary storage unit 206 is operable to store persistent data such as, but not limited to, computer executable instructions associated with software applications or an operating system. These instructions are passed from the secondary storage unit 206 to main memory 204 for enabling execution by the processor 202. In some embodiments, the inventory database 132, the business rules database 134, and the device information database 135 are storage components of the secondary storage unit 206. In such embodiments, the processor 202 is operable to access the inventory database 132, the business rules database 134, and the device information database 135 to perform product return operations described herein. In further embodiments, machine instructions for performing one or more operations described herein are also stored in the secondary storage unit 206. In such embodiments, the processor 202 is operable to access the secondary storage unit 206 to obtain one or more machine instructions and to execute the machine instructions to perform one or more of the operations described herein.

Figure 3:
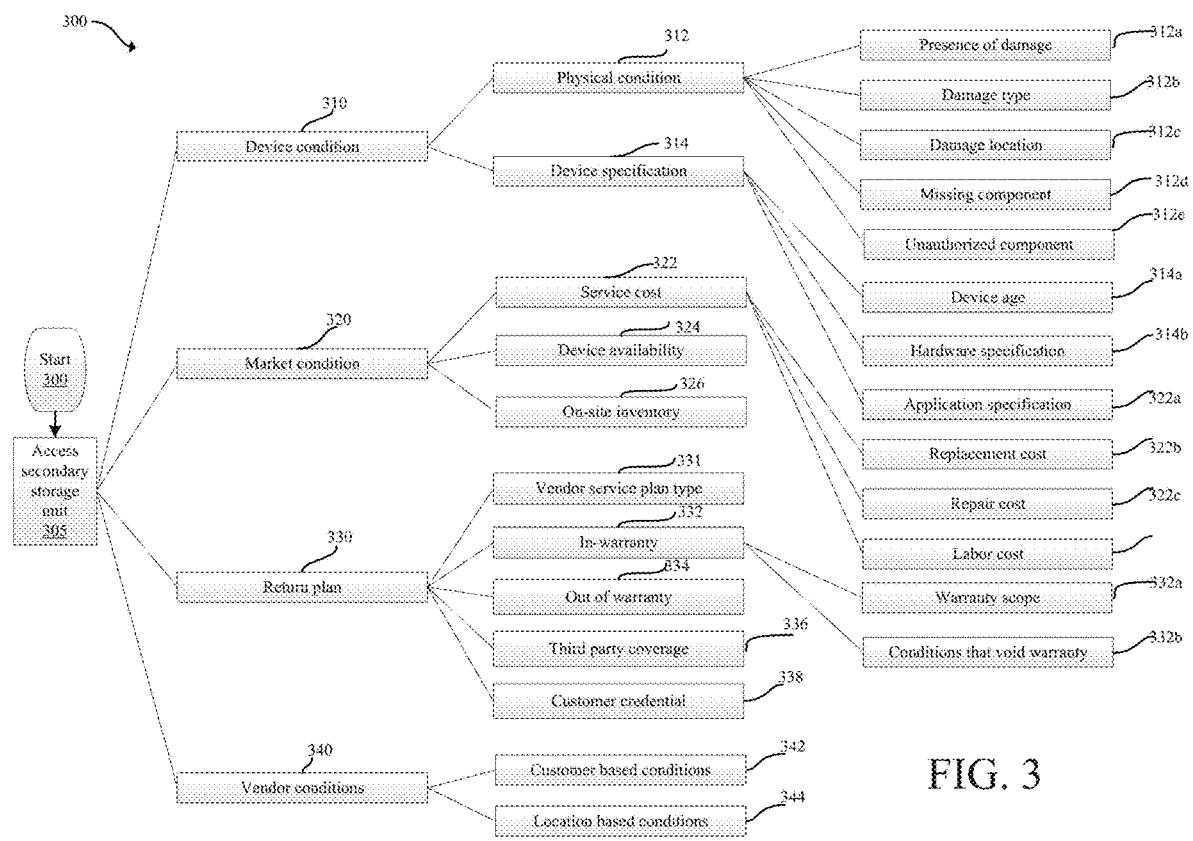
FIG. 3 is a tree diagram illustrating a process for processing product return requests according to a disclosed embodiment.

FIG. 3 is a tree diagram illustrating a process 300 for processing product return requests according to a disclosed embodiment. Although operations in the process 300 are shown in a particular sequence, certain operations may be performed in different sequences or at the same time where feasible. Product return requests may be grouped into different categories or types of product returns, such as requests to process warranty claims, requests to repair electronic devices, requests to replace electronic devices, requests to trade-in electronic devices, requests to dispose electronic devices, as well as other categories of product return requests disclosed herein to service various electronic devices. In some embodiments, the product return requests are governed by various business rules that collectively specify whether to accept certain product return requests. The business rules for processing the product return requests are categorized into different categories such as a device condition category, a market condition category, a return plan category, and a vendor conditions category.

At block 300, the processor 202 receives a product return request to return the electronic device 104 for a full refund (a first product return request). At block 305, the processor 202 accesses the secondary storage unit 206 to obtain information about the electronic device 104. As stated herein, information about the electronic device 104 includes manufacturing specification of the electronic device 104, market conditions of the electronic device 104, vendor information about the vendor of the electronic device 104, customer information about the customer of the electronic device 104, as well as other quantifiable information about the electronic device 104. For example, the processor 202 accesses the secondary storage unit 206 to determine the current inventory of the electronic device 104 and to obtain various costs associated with the electronic device 104.

At block 310, the processor 202 accesses the device condition category to obtain applicable business rules for processing the first product return request based on one or more device specific conditions. The device condition category is further divided into a physical condition subcategory and a device specification subcategory to provide more granular categorization of business rules for processing the first product return request. At block 312, the processor 202 accesses the physical condition subcategory, which includes business rules for processing the first product return request based on the physical condition of the electronic device 104. The physical condition subcategory is further divided into a presence of damage subcategory, a damage type subcategory, a damage location subcategory, a missing component subcategory, and an unauthorized component subcategory.

At block 312*a*, the processor 202 accesses the presence of damage subcategory to obtain business rules for processing the first product return request based on whether the electronic device 104 is damaged. In some embodiments, the foregoing business rules specify whether the first product return request may be accepted based on whether the electronic device 104 is damaged. In one of such embodiments, the foregoing business rules also specify whether the electronic device 104 may be processed under a different category of product return request. For example, the business rules specify that the first product return request, which is to return the electronic device 104 for a full refund, cannot be accepted due to damage to the electronic device 104. However, the electronic device 104 may be returned for a partial refund, exchanged for another electronic device of identical model (an identical model device), or repaired and subsequently returned to the customer. The foregoing business rules may vary based on the device type of the electronic device 104. For example, the foregoing business rules may specify that the first product return request may be accepted if the electronic device 104 is a smartphone, but the electronic device 104 may only be exchanged if it is a television.

At blocks 312*b* and 312*c*, the processor 202 accesses the damage type subcategory and the damage location subcategory, respectively, to obtain business rules for processing the first product return request based on damage type and damage location, respectively. For example, the foregoing business rules may specify that the first product return request may be accepted if the damage is a scratch and the electronic device 104 is a smartphone. However, the electronic device 104 may only be repaired and returned to the customer if the damage is a shattered display screen. Moreover, the business rules may specify that the first product return request may be accepted if the scratch is on the casing of the electronic device 104 but only a partial refund may be provided if the scratch is on the display screen of the electronic device 104. The foregoing business rules may also specify whether to accept the first product return request based on the severity of damages to the electronic device 104. In one embodiment, the severity of damages is based on the type of the damage and the location of the damage. In that regard, the processor 202 may perform one or more operations described herein to determine the severity of the damages. In some embodiments, the processor 202 is operable to provide all available types and categories of product return requests that satisfy the foregoing business rules. Continuing with the previous example, if the electronic device 104 does not contain any damage, then the processor 202 may generate a notification that the first product return request has been accepted and provide a list of other acceptable categories of product return requests, such as to exchange the electronic device 104 for a new identical device, to return the electronic device 104 for vendor credit, to trade-in the electronic device 104 for a different electronic device 104, as well as other quantifiable types and/or categories of product return requests.

At blocks 312*d* and 312*e*, the processor 202 accesses the missing component subcategory and the unauthorized component subcategory, respectively, to obtain business rules for processing the first product return request based on whether one or more components of the electronic device 104 is missing and whether one or more unauthorized component are installed on the electronic device 104, respectively. In some embodiments, the processor 202 is operable to obtain the manufacturing specification of the electronic device 104 to determine the authorized components of the electronic device 104. In one of such embodiments, the processor 202 is operable to communicate with the electronic device 104 to determine which components are installed on the electronic device 104. In another one of such embodiments, the processor 202 is operable to operate one or more sensors to determine which components are installed on the electronic device 104. In such embodiments, the processor 202 is further operable to compare the authorized components with the actual components to determine if any authorized component is missing and/or if any unauthorized component is installed on the electronic device 104.

In some embodiments, the business rules include rules that specify whether to accept the first product return request as well as acceptable types and/or categories of product return requests based on whether there is any discrepancy, the type of the authorized component is missing, the type of the unauthorized component, the number of missing authorized components, and similar factors disclosed herein. For example, the business rules may specify that the first product return request cannot be accepted if the electronic device 104 is a smartphone and is missing an authorized processor, but may be repaired if the electronic device 104 is a smartphone and includes an unauthorized casing. Further, the business rules may specify that the electronic device 104 may not be returned under any circumstance if certain authorized firmware programs have been altered to exploit certain features of the electronic device 104.

At block 314, the processor 202 accesses the device specification subcategory, which is divided into a device age subcategory, a hardware specification subcategory, and an application specification subcategory. At blocks 314a, 314b, and 314c, the processor 202 accesses the device age subcategory, the hardware specification subcategory, and the application specification subcategory, respectively, to obtain business rules for processing the first product return request based on the age of the electronic device 104, the specification of the hardware components of the electronic device 104, and the specification of applications of the electronic device 104, respectively. For example, the foregoing business rules may specify that the first product return request may not be accepted if the age of the electronic device 104 is greater than a first threshold value, if the electronic device 104 contains hardware components that are no longer manufactured by the vendor of the electronic device 104, or if the vendor of the electronic device 104 no longer supports any of the applications installed on the electronic device 104. The foregoing business rules, similar to the business rules under the physical condition subcategory, may vary based on the device type of the electronic device 104. For example, the foregoing business rules may specify that the first product return request may be accepted if the electronic device 104 is a watch and the device age of the watch is less than six months, but may only accept the first product return request if the electronic device 104 is a tablet computer and the device age of the tablet computer is less than three months.

At block 320, the processor 202 accesses the market condition category to obtain applicable business rules for processing the first product return request based on one or more market conditions. The market condition category is further divided into a service cost subcategory, a device availability subcategory, and an on-site inventory subcategory. At block 322, the processor 202 accesses the service cost subcategory. The service cost subcategory is further divided into a replacement cost subcategory, a repair cost subcategory, and a labor cost subcategory. At blocks 322a, 322b, and 322c, the processor 202 accesses the foregoing subcategories, respectively, to obtain business rules for processing the first product return request based on the current replacement cost, the current repair cost, and the current labor cost, respectively. For example, the foregoing business rules may specify that the first product return request may be accepted if the replacement cost is below a first cost threshold. In addition, the electronic device 104 may also be replaced for a new identical model device if the replacement cost is below the first cost threshold. However, the business rules may specify that the electronic device 104 may be repaired but not replaced if the replacement cost is above the first threshold but the repair cost is below a second threshold. Further, the business rules may specify that only the first product return request is available if the labor cost is above a third threshold. In some embodiments, the foregoing costs as well as other costs discussed herein dynamically change based on the current market conditions. For example, if the labor cost associated with servicing the electronic device 104 doubles within one month, then the same business rules that specify only the first product return request may be accepted one month may also accept additional available types and/or categories for product return requests in another month.

At blocks 324 and 326, the processor 202 accesses the device availability and the on-site inventory subcategories, respectively, to obtain business rules for processing the first product return request based on the number identical model devices available and the number of identical model devices that are on-site, respectively. For example, the foregoing business rules may specify that only the first product return request or a request to repair the electronic device 104 may be accepted if the number of identical model devices is below a first threshold number of units or if the number of on-site identical model devices is below a second threshold number of units. However, the same business rules may specify that the electronic device 104 may also be exchanged for an identical model device if the number of on-site identical model devices is greater than a third threshold number of units, where the third threshold is greater than the second threshold.

At block 330, the processor 202 accesses the return plan category to obtain applicable business rules for processing the first product return request based on one or more return plans that cover the electronic device 104. The return plan category is further divided into a vendor return plan type subcategory, an in-warranty subcategory, an out of warranty subcategory, a third party coverage subcategory, and a customer credential subcategory. At block 331, the processor 202 accesses the vendor service plan type category to obtain business rules for processing the first product return request based on the type of vendor service plan the electronic device 104 is covered under. Examples of service plans offered by the vendor of the electronic device 104 include various plans to return, replace, exchange the electronic device 104 as well as other types of return plans offered by electronic device vendors. The foregoing business rules specify whether to accept the first product return request and the availability of other types and/or categories of product return requests based on vendor service plans that cover the electronic device 104.

At block 332, the processor 202 accesses the in-warranty subcategory if the electronic device 104 is covered under one or more available warranties. The in-warranty subcategory is further divided into a warranty scope subcategory and a void warranty subcategory. At block 322a, the processor 202 accesses the in-warranty subcategory to obtain business rules for processing the first product return request based on the scope of warranties that cover the electronic device 104. For example, the foregoing business rules may specify that the first product return request may not be accepted and that only a partial refund may be processed based on the scope of the warranties that cover the electronic device 104. At block 332b, the processor 202 accesses the void warranty subcategory to obtain business rules for processing the first product return request if certain conditions would void one or more warranties that cover the electronic device 104, and if at least one of such conditions has been satisfied. For example, the foregoing business rules may specify certain software exploitations, such as jail-breaking the electronic device 104 or presence of certain types of damages, such as water damage to interior components of the electronic device 104, would void all available warranties that cover the electronic device 104. In such case, the processor 202 rejects the first product return request and indicates that no other type and/or category of product return request is available upon determining that a condition that would void all of the warranties has been satisfied.

At block 334, the processor 202 accesses the out of warranty subcategory if the electronic device 104 is not covered under any warranty. In some embodiments, the business rule specifies that the electronic device 104 may not be returned under any type and/or category of product return request. In other embodiments, the business rules specify that although the first product return request may not be accepted, the electronic device 104 may be exchanged for vendor credit.

At block 336, the processor 202 accesses the third party coverage subcategory if the electronic device 104 is covered under one or more third party return plans. As defined herein, third party return plans include any return plan that is not provided by the vendor of the electronic device 104. Third party return plans include return plans from credit card companies, insurance companies, as well as other companies that provide return plans in addition to return plans provided by the vendor. For example, if the electronic device 104 is insured by an insurance agency under an insurance plan, then the first product return request may still be accepted based on the terms of the insurance plan regardless of whether the electronic device 104 is in-warranty or out of warranty.

At block 338, the processor 202 accesses the customer credential subcategory to obtain business rules that specify whether the first product return request may be accepted based on whether the processor 202 has access to sufficient customer credentials. Customer credentials may include customer information, such as the customer's address, telephone number, credit card information, biological information, customer passwords, as well as other quantifiable information that is related to the customer, or information that indicates that the consumer is authorized to submit the first product return request. The processor 202 may obtain the customer credentials from the secondary storage unit 206. The processor 202 may also query the customer to provide additional customer credentials if the processor 202 does not have access to sufficient customer credentials. In some embodiments, customer credentials may also be established by satisfying a set of guidelines for returning the electronic device 104. For example, the guidelines for accepting the first product return request may require the customer to first submit an online return merchandise authorization (RMA) request within a first threshold period of time. In one of such embodiments, the first product return request may not be accepted until the customer has submitted the RMA request and has received a confirmation from the vendor of the electronic device 104.

At block 340, the processor 202 accesses the vendor conditions category to obtain applicable business rules for processing the first product return request based on one or more vendor specified conditions. The vendor conditions category is further divided into a customer based conditions subcategory and a location based conditions subcategory. At block 342, the processor 202 accesses the customer based conditions subcategory to obtain business rules for processing the first product return request based on one or more vendor instructions regarding returns made by the customer of the electronic device 104. In some embodiments, the vendor of the electronic device 104 has one or more prearrangements with the customer of the electronic device 104. For example, if the customer of the electronic device 104 is a top purchaser of the vendor's products, then the vendor may accept all product returns from the customer regardless of whether the returned products are covered under one or more warranties. At block 344, the processor 202 accesses the location based conditions subcategory to obtain business rules for processing the first product return request based on the location of the facility 102, the location of the customer, the location of the vendor, as well as other location based considerations. For example, the facility 102 may be located in a jurisdiction that contains specific laws and regulations that govern how to process the first product return request as well as other available types and/or categories of product return requests. The laws and regulations may control how to package and handle the electronic device 104, how to recycle certain components of the electronic device 104, whether to collect fees and/or taxes, the amount of fees and taxes to be collected, as well as other aspects of returning the electronic device 104.

In some embodiments, the processor 202 transmits an electronic message to the customer indicating whether the first product return request has been accepted. In one of such embodiments, the electronic message includes reasons why the first product return request is not accepted under the first product return request in response to a determination that the first product return request should not be accepted. In another embodiment, the electronic message includes an option for retrieving at least one of detailed images and video of the electronic device depicting a device condition of the electronic device upon opening of a package in which the electronic device is received in. In some embodiments, certain business rules for processing the first product return supersede other business rules for processing the first product return. In one of such embodiments, business rules associated with vendor based conditions supersede business rules associated with return plans that cover the electronic device 104. In some embodiments, the processor 202 may simultaneously proceed through multiple blocks of the process 300. For example, the processor 202 may simultaneously proceed through blocks 312a-312e to obtain business rules that specify whether to accept the first product return request based on presence of damage, damage type, damage location, whether one or more authorized component are missing and whether one or more unauthorized components are installed on the electronic device 104. As such, the process 300 allows the processor 202 to efficiently determine applicable business rules for processing the first product return.

Although the previous paragraphs describe the process 300 being performed by a processor 202 of the system 200, the process 300 may also be performed by other systems described herein, or by similar systems that are operable to obtain business rules for processing product returns and process product returns based on the obtained business rules. Further, although the operations describe obtaining business rules to process the first product return request of the electronic device 104, the operations may also be performed to obtain other business rules to process other types and/or categories of product return requests of other electronic devices.

Figure 4:
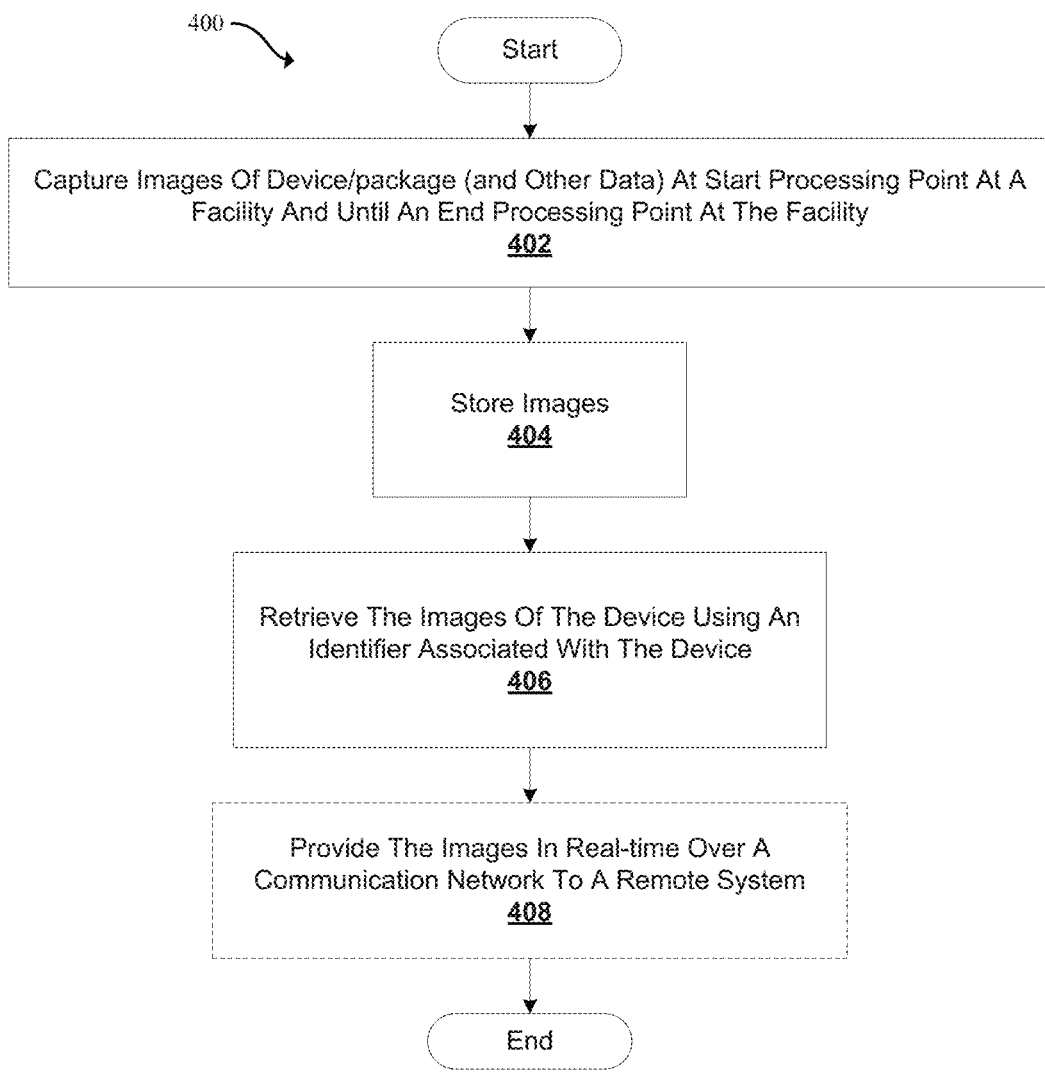
FIG. 4 is a flow diagram depicting an example of a process for visually tracking a product during processing according to a disclosed embodiment.

FIG. 4 is a flow diagram depicting an example of a process 400 for visually tracking a product during processing according to a disclosed embodiment. In the depicted embodiment illustrated in FIG. 4, the process 400 starts at block 402 by capturing images of an electronic device, such as the electronic device 104, beginning from a start processing point at a facility and until an end processing point at the facility as described in the various embodiments above. Also, as previously noted, in certain embodiments, the process may also be operable to capture images of a packaging container of the electronic device and/or other information or components of the electronic device, such as, but not limited to, those described above. For example, in one embodiment, the process is operable to capture a detailed image of the electronic device at every stage of processing, from unloading of the package, receiving the package, opening the package, removing the electronic device from the packaging, external cosmetic images of the electronic device at all angles, images of the electronic device being powered tested, images of a cover being removed, detailed images of internal components of the electronic device, images of the electronic device as each component is removed or analyzed, images of damaged components, images of new components or the electronic device while being repaired or updated, images of the device as it is being reassembled step-by-step, images of the electronic device as it is being repackaged, etc.

At block 404, the process is operable to store the images associated with the electronic device in a data storage unit such as, but not limited to, the image storing device 136 as described above. In some embodiments, in addition to the images, the process is operable to include a textual description describing each of the images. The textual description may be a pre-determined description (e.g., unpacking device, removing cover, etc.) and/or may include text entered by a user (e.g., note minor scratch on left corner of screen). In some embodiments, the images may include identification information that may be utilized to identify, authenticate and/or track the electronic device. For example, the identification information is an image of a signature of a person receiving the electronic device, a signature of a person signing that the inspection is complete, an employee identification number of the person receiving the electronic device, a serial number of the electronic device, a barcode of the electronic device, a trademark of the vendor of the electronic device, an address of the current location of the electronic device, and/or other information included in the images of the electronic device.

In one embodiment, at block 406, once the images are stored, they may be retrieved, at any time, by querying the data storage unit using an identifier associated with the electronic device. For example, in one embodiment, the process is operable to receive at least one of an IMEI, serial number, owner/customer name, telephone, and/or other identifiers associated with the electronic device. As discussed above, other data tied to the images of the electronic device may also be retrieved, such as the contact information of an employee that processed the electronic device or an employee that reported the loss.

In addition to or alternatively, in one embodiment, at block 408, the process is operable to provide the images in real-time or near real-time over a communication network to a remote system. This may occur in response to receiving a request to view the processing of a particular electronic device or devices or may be performed automatically for a particular client/customer. Real-time is defined as the actual time during which a process or event occurs. The remote system may be any system operable to receive the images such as, but not limited to, a smart phone, smart watch, tablet device, laptop, desktop, and/or server. The remote system may be operated by an individual such as a consumer or owner of the electronic device or may be a system owned/operated by a manufacturer, telecommunication service provider, or other third party businesses such as, but not limited to, a recycler, reseller, or refurbisher of electronic devices. In one embodiment, the process is operable to allow the remote system to control the image capturing process. For example, in one embodiment, the process is operable to allow the remote system to zoom in and/or capture particular images. Additionally, in some embodiments, the remote system may send an alert notification, comment, and/or a question to the system 200 if an issue is spotted during the real-time monitoring.

Figure 5:
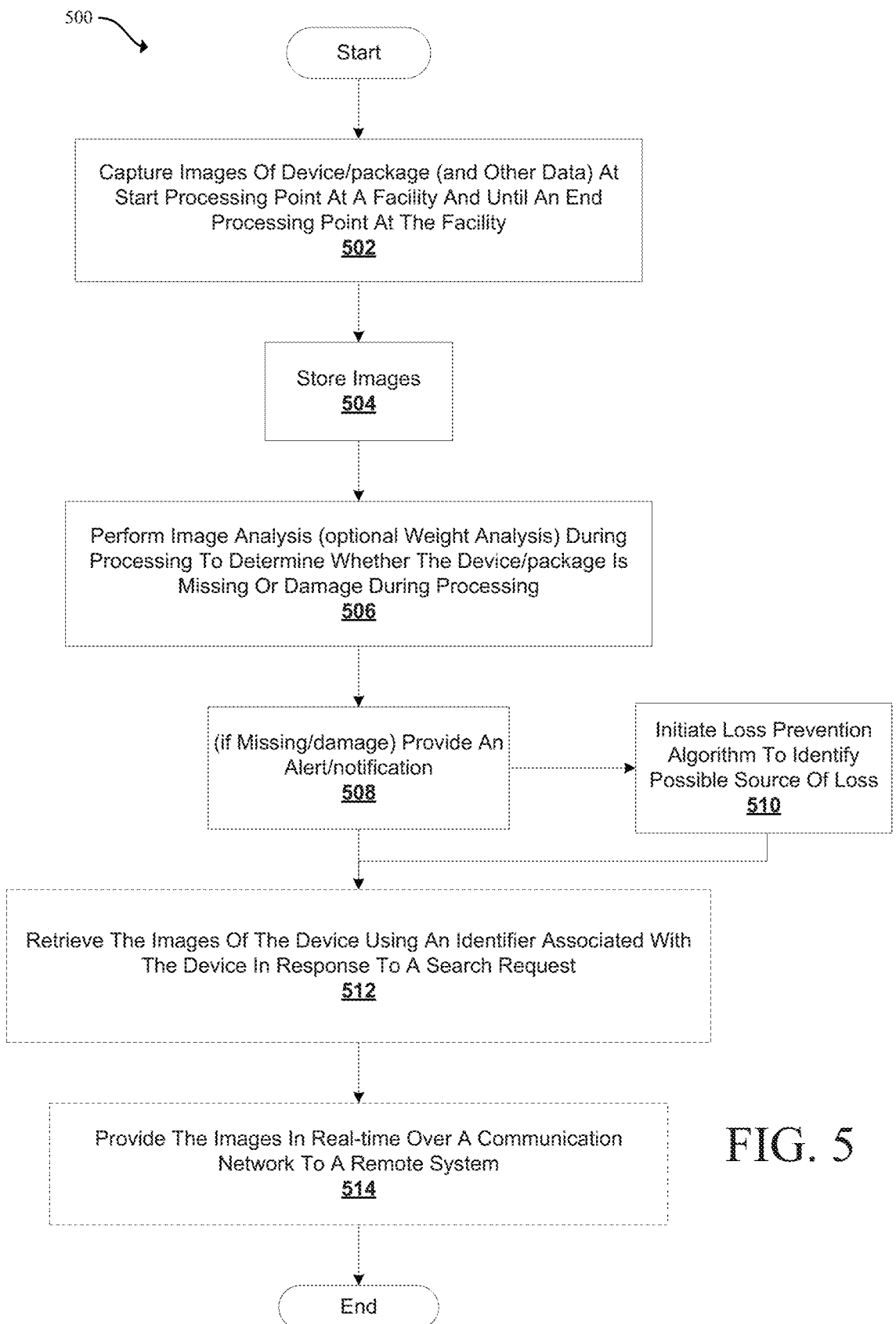
FIG. 5 is a flow diagram depicting an example of a loss prevention process according to a disclosed embodiment.

Additionally, as disclosed herein, the system 200 may be operable to execute a program, script, or algorithm for performing a loss prevention process 500 as illustrated in the example shown in FIG. 5. As used herein, the term loss refers to items that have been misplaced, stolen, and/or intentionally or accidently damaged. Similar to corresponding blocks 402 and 404, blocks 502 and 504 are operable to capture images of an electronic device beginning from a start processing point at a facility and until an end processing point at the facility, and store the images associated with the electronic device in a data storage unit.

At block 506, the process is operable to perform an image analysis during processing to determine whether the electronic device and/or the packaging became damaged and/or missing during processing. In one embodiment, the process is operable to repeatedly perform this analysis during the processing of the electronic device. Alternatively, in some embodiments, the process is operable to perform this analysis at particular points during processing, such as, but not limited to, at particular predetermined workstations such as when the electronic device is being analyzed and during final packaging. To perform this comparison, in one embodiment, the process is operable to compare an initial image of the electronic device and/or package to a current state of the electronic device during processing. The initial image of the electronic device and/or package may be when the electronic device is first received and unpackaged. Alternatively, the initial image of the electronic device and/or package that is being compared may be when the electronic device has been repaired or refurbished. Using these initial images, the process is operable to determine if the device becomes damaged or missing during processing of the device. For example, if, at block 508, the initial image shows that the screen of the electronic device is not damaged, any subsequent image that shows damage to the screen will indicate an alert or notification that the screen was damaged during processing. Similarly, if, at block 508, an electronic device fails to be captured at a subsequent point or workstation by the one or more image capturing devices, the process is operable to indicate an alert or notification that the device is missing.

In one embodiment, the process, at block 510, is operable to initiate a loss prevention algorithm to identify a possible source of loss. For example, in one embodiment, once the process determines that the device has been damaged or is missing during processing, the process is operable to automatically work in reverse from that point to determine when the damaged occur or when the device went missing. For example, in one embodiment, the process is operable to perform a frame by frame comparison in reverse until the cause of the damage is determined. Alternatively, the process may jump to a discrete portion of the captured image (e.g., in the middle or go back a quarter of the current process) or to a particular workstation to determine if the device was damaged or missing at that particular workstation or at that point in time. If the device is damaged or missing at that point, the process can work further back in a similar manner until a possible source of loss is discovered. If the device is not damaged or missing at that point, the process can work forward in a similar manner until a possible source of loss is discovered.

In some embodiments, the process is operable to take into account data acquired from previous source of damage/lost determination. For example, if the previous data indicates that a particular cause of particular type of damage occurs primarily at a particular workstation, the process may be operable to initiate the loss prevention algorithm at the particular workstation and work forward or backwards as necessary. Once the source of the damage or loss is identified, the process is operable to update the loss/damage knowledge database to assist in future loss identification.

Similar to the visual tracking process 400, the loss prevention process 500 may optionally include blocks 512 and 514 that are respectively operable to retrieve the images of the electronic device using an identifier associated with the device in response to a search request and/or for providing the images in real-time over a communication network to a remote system.

Figure 6:
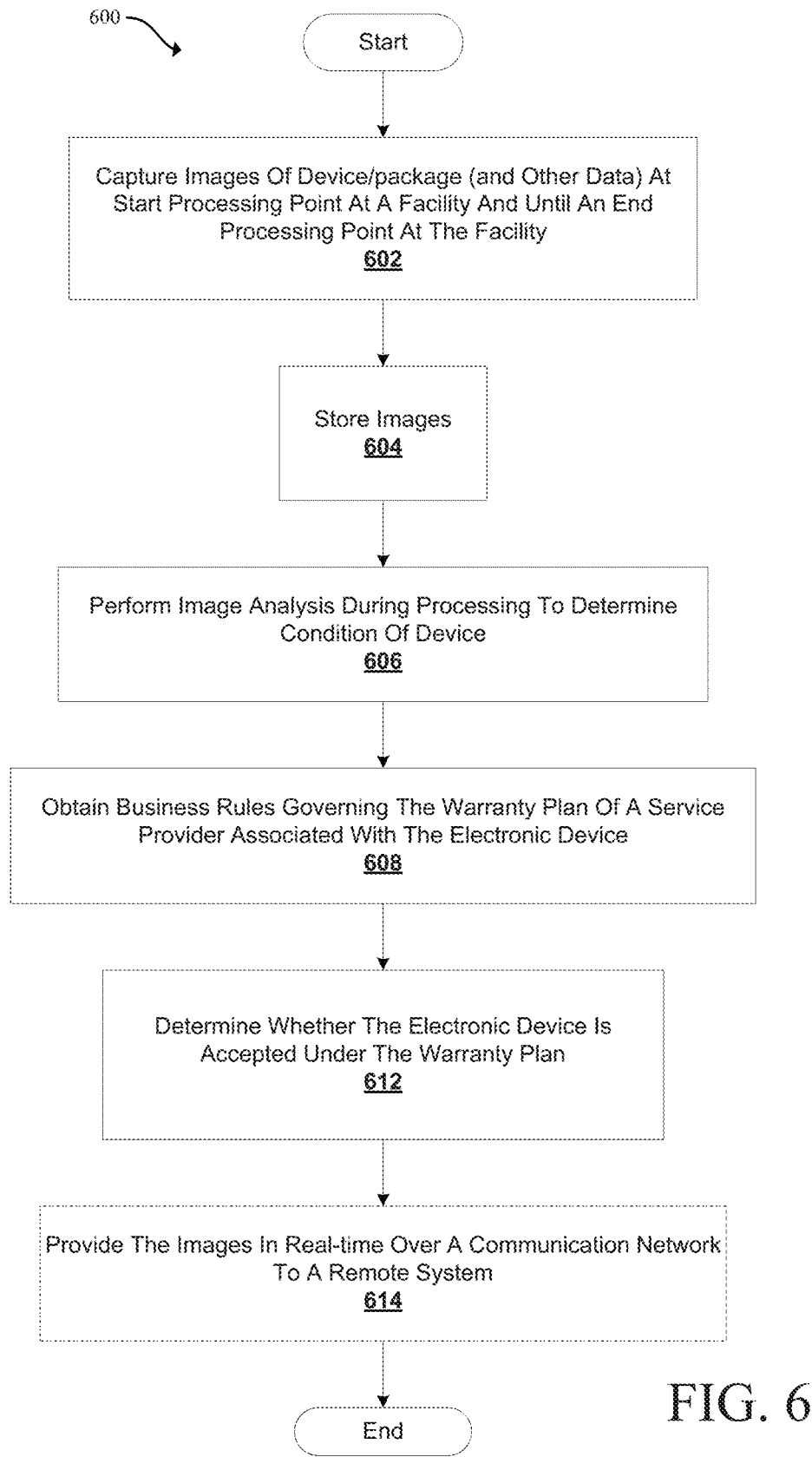
FIG. 6 is a flow diagram depicting example of an automated process for determining whether an electronic device is accepted under a warranty plan according to a disclosed embodiment.

In another embodiment, the system 200 is operable to execute a program, script, or algorithm for performing an automated warranty claim, repair request, and/or evaluation analysis using the various methods disclosed herein. For example, FIG. 6 is a flow diagram depicting an example of an automated process 600 for determining whether an electronic device is accepted under a warranty plan according to a disclosed embodiment. Similar to corresponding FIGS. 4 and 5, blocks 602 and 604 are operable to capture images of an electronic device beginning from a start processing point at a facility and until an end processing point at the facility, and store the captured images associated with the electronic device in a data storage unit.

At block 606, the process is operable to perform image analysis during the processing of the electronic device to determine a condition of the electronic device. In some embodiments, the image analysis may be performed at a single workstation, two or more workstations, or during the entire warranty claim process. In one embodiment, in performing the image analysis, the process is operable to automatically determine a type and model of the electronic device. For example, in one embodiment, the process is operable to identify an IMEI of the electronic device. For instance, the IMEI is often found printed on the back side of a smart phone and/or printed on a label on the electronic device. In one embodiment, the process is operable to use the one or more image capturing devices 120 to identify the IMEI. In some embodiments, the process is operable to electronically couple the system 200 with the electronic device and retrieve the IMEI or other device identifier from the device's software or firmware. For example, in some embodiments, the system 200 includes a plurality of port connectors including, but not limited to, lightning port, thunderbolt port, universal serial bus (USB) port, and micro USB port that allow the system 200 to electronically couple with the electronic device.

Additionally, as part of the analysis process, in some embodiments, the system 200 is operable to electronically couple with the electronic device to perform software and hardware testing of the electronic device. For example, the system 200 may test the battery, perform a pixel test for assessing image quality, measure temperature and processor performance, perform radio testing, perform input and output testing, and otherwise verify that the device is operating as intended. In some embodiments, records of the testing results are stored in the secondary storage unit 206. In one of such embodiment, the records include details of the testing results, including testing procedures and protocols, steps taken by the operator to perform the tests, which tests the electronic device passed, which tests the electronic device failed, reasons for failure, the operator's comments regarding one or more of the tests, as well as other information about the tests, the test results, and how the test results were achieved. In some embodiments, the system 200 is operable to restore the electronic device to a factory condition or upgrade the electronic device to a newer software version.

Once a type and model of the electronic device is determined, the process is operable to retrieve one or more standard images of the same type and model of the electronic device. The standard images may be actual photographic images or may be electronic images/files of the electronic device such as, but not limited to, a three-dimensional scan. The standard images are used as a standard for determining whether the electronic device is damaged. For example, in one embodiment, by comparing the standard images to the electronic device, the process is operable to detect flaws, such as scratches, dents, cracks, color variations, water damage, and other signs of damage or wear and tear on the electronic device.

In some embodiments, once the device has been analyzed, the process at block 608 is operable to obtain business rules governing a warranty plan of a service provider or manufacturer associated with the electronic device. In one of such embodiments, one or more blocks of the process 300 is performed to obtain the business rules that govern the warranty plan of the service provider or manufacturer associated with the electronic device. In one embodiment, each service provider or manufacturer may have a separate/different set of business rules governing their coverage under a warranty plan. For example, the business rules may indicate which products are covered under warranty, a timeframe in which a product is covered under warranty, the parts and types of damage covered under warranty such as, but not limited to, whether damage caused by the user is covered under warranty such as water damage, the electronic device being dropped and/or misused. In one embodiment, the business rules may include a weighting algorithm that applies a different weight to a particular type of damage or component of the electronic device. For example, water damage to the electronic device may be weighted a 10 on a scale of 10, whereas cracks to a screen maybe given weight of 1 through 5 depending on severity of the crack, minor dents may be weighted a 2, scratches may be 1 for each major scratch, and a broken hinge that is repairable may be weighted a 3. Each service provider or manufacturer may set their own weight scale for particular damages or components. In one embodiment, the business rules may set a maximum damage threshold value that when the various weighted combination of damages are added together, it cannot exceed the maximum damage threshold value. For example, in one embodiment, if the maximum damage threshold value is 9, then using the above example, any water damage to the electronic device exceeds the threshold and will automatically be rejected irrelevant of any other damages. The maximum damage threshold value may be set differently for different types and models of electronic devices. Again, each service provider or manufacturer may set their own maximum damage threshold value.

Additionally, in one embodiment, the business rules may be adjusted in real time based on real-time inventory, pricing, and market conditions such as, but not limited to, consumer demand and/or whether a new device is expected to be released that competes with the electronic device. For example, in one embodiment, the process is operable to retrieve real-time inventory to determine the inventory associated with the model and type of electronic device being processed, and based on the level of inventory, the scale for the weighting algorithm and/or the maximum damage threshold value may be adjusted on the fly. For example, in one embodiment, if the real-time inventory indicates a high level of inventory for the type and model of the electronic device and that the consumer demand for the type of model of the electronic device is low, the process is operable to adjust the weighting scale up for damages to the electronic device and/or lower the maximum damage threshold value. Thus, only electronic devices that have very little damage will be accepted back under the warranty plan of the service provider or manufacturer. In some embodiments, the business rules for the service provider or manufacturer may be set differently based on whether the electronic device is being accepted back as a warranty defect or whether the device is being accepted back under the warranty plan as part of an upgrade program in which the consumer receives a newer model. For example, in one embodiment, if the electronic device is being accepted back under the warranty plan as part of an upgrade program, then the maximum damage threshold value may be increased as compared to the maximum damage threshold value of when the electronic device is being accepted back as a warranty defect.

At block 612, the process is operable to determine whether the electronic device is accepted under the warranty plan based on the business rules. In one embodiment, the business rules and/or weighting scale determination may be provided to the customer of the electronic device to provide detailed reasoning as to why or why not an electronic device was accepted under the warranty plan. In one embodiment, a detailed image is provided of each item that receives a damage score. In addition, a link may be provided in the electronic notification to allow the customer of the electronic device to retrieve additional images and/or video of the processing of the electronic device. Alternatively, and/or in addition to, in some embodiments, at block 614, the customer of the electronic device may receive a notification such as, but not limited to, an email or text that includes a link or other information that allows the customer of the electronic device to view the live processing of electronic device. In one embodiment, the customer of the electronic device may be able to communicate during the live session with an operator at the facility involved in the processing of the electronic device to provide additional information and/or to receive information during the process. Thus, the customer or owner of the electronic device may be involved or contribute in the processing of the electronic device. For example, the customer of the electronic device may be able to explain why there appears to be water damage or why a component was previously replaced.

In some embodiments, the customer may be asked to provide credentials during the foregoing process. As stated herein, customer credentials may include customer information, such as the customer's address, telephone number, credit card information, biological information, customer passwords, codes to access the electronic device, as well as other quantifiable information that is related to the customer or information indicative that the customer has sufficient credentials to return the electronic device. In some embodiments, the customer credentials may be established after a set of guidelines is satisfied. For example, the guidelines may require the customer to first submit an online return merchandise authorization (RMA) request within the first threshold period of time. In one of such embodiments, the foregoing process cannot be completed until the customer has submitted the RMA request, has received a confirmation from the vendor of the electronic device, and has provided the confirmation to the operator.

Figure 7:
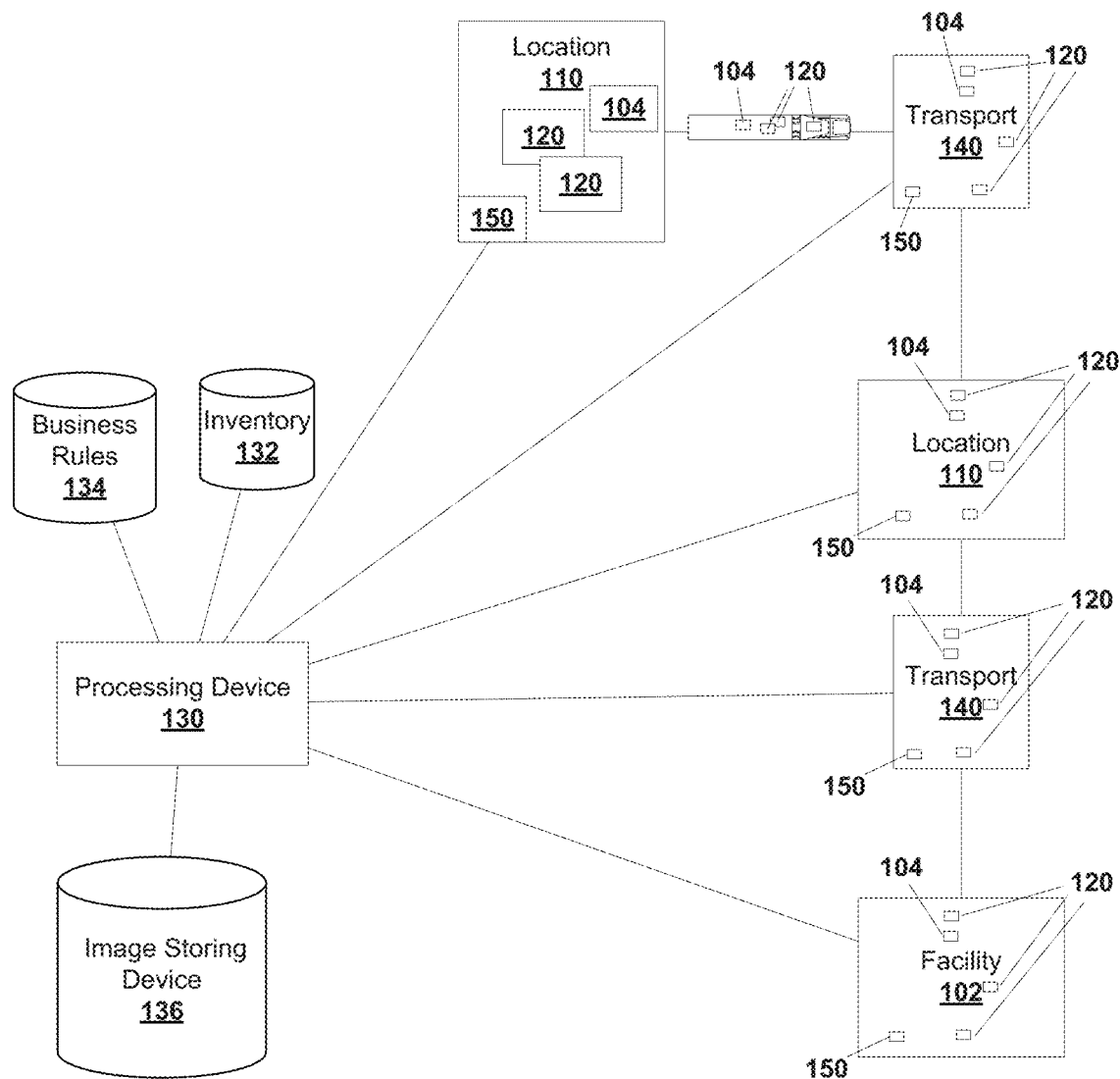
FIG. 7 is a schematic diagram depicting another example of a visual tracking and loss prevention system according to a disclosed embodiment.

FIG. 7 is a schematic diagram depicting another example of a visual tracking and loss prevention system according to a disclosed embodiment. In the depicted embodiment, in addition to receiving data and images from the one or more image capturing devices 120 at the facility 102 as described above, the processing device 130 is operable to receive information including images from one or more image capturing devices 120 located at various locations 110. Locations 110 may include, but not limited to, a retail location such as a telecommunications service provider retail store such as an AT&T®, Verizon®, Sprint®, and T-Mobile® store; a manufacturer or technology provider store such as Apple®, Microsoft®, and Samsung®; and a retail location such as Best Buy®, Costco®, and Walmart®. Locations 110 may be physically located in different cities, states, or other countries.

At each of the various locations 110, at least one computing device 150 is operable to communicate data with the processing device 130 over one or more private or public networks. Non-limiting examples of data that may be communicated to the processing device 130 from each of the various locations 110 may include images from one or more image capturing devices 120 located at each of the various locations 110; current inventory at each of the various locations 110; the names of employees working at the various locations 110; work schedules; sales information such as, but not limited to, name of a clerk that assisted a customer with a sale or service related to a particular electronic device; device information such as IMEI number, serial number, model, and service provider; lost or damage information such as the number of loss, cost related to loss, name of clerk reporting the loss of an electronic device, the type of loss or damage, reason for loss, etc.

Additionally, at each of the various locations 110, a set process may be put in place to provide serialized tracking associated with an electronic device as soon as it enters the location 110. The serialized tracking includes collecting data and capturing the chain of custody of an electronic device. For example, in one embodiment, when a customer or package arrives at the location 110 with an electronic device, an employee or clerk manually enters or scans an identifier or other information associated with the electronic device into the system. For example, in one embodiment, the IMEI of a mobile device is scanned or manually entered into the system. In one embodiment, based on the IMEI, the system performs a lookup to identify a model of the electronic device and populates the system with information corresponding to the model such as, but not limited to, parts information (e.g., battery, memory, screen, button, chassis, camera, and antenna), cost associated with each part, and whether the part is available in inventory or backorder status. Other data that may be captured by the system includes customer information, clerk/employee information, reported problems or issues associated with the electronic device, and any prior repairs or issues associated with the electronic device. The clerk/employee information may be manually entered or may be automatically determined based off of a user account and/or a device or machine that is assigned to the clerk/employee that is processing the transaction.

In one embodiment, if possible, the clerk will attempt to repair or fix the problem or issue with the electronic device. If the clerk is able to repair the electronic device, the clerk may note the repair in the system and process the electronic device for return back to the customer. If the clerk is unable to repair the electronic device, the clerk may annotate any steps taken to try to repair the electronic device and the results of such actions. Further, in one embodiment, if the clerk is unable to repair the electronic device, the clerk may place the electronic device in a secure bag or package and seal the package for shipping to a repair processing center. In one embodiment, the clerk scans a package or bag identifier to indicate that he has secured the electronic device in the package for shipping. The package is then placed in a storage or shipping bin or container by the clerk. An identifier associated with the storage or shipping bin may be logged to indicate which container the package has been placed in. The bins or packages may be rescanned when they are picked up for shipping.

In one embodiment, any additional access to the electronic device prior to shipping is also logged. For example, if the same clerk or another clerk reopens the package, the name of the clerk and a timestamp is logged in the system. Various security measures may be used to seal the package including, but not limited to, tamper resistant security tape that indicates if the package has been opened. The device is repackaged and logged in a similar manner each time it is accessed.

Additionally, in some embodiments, the bins may include additional security measures that prevent packages from being removed from the bin and/or that prevents the bins from being opened or moved without authorization. For example, in one embodiment, the bins may require a user code that uniquely identifies a user to be entered to allow the bins to be opened or moved.

In one embodiment, each time the device is accessed or moved, the system triggers the one or more image capturing devices 120 to capture images of the electronic device. For example, the one or more image capturing devices 120 may record any attempts by employees at the location 110 to fix or repair the electronic device. Further, the one or more image capturing devices 120 may record the packaging of the electronic device for shipping and the actual delivery of the package for shipping (e.g., recording the package being handed to a shipper or loaded onto a shipping truck).

In certain embodiments, one or more image capturing devices 120 may also be used to capture images of an electronic device 104 while in transport and up to the point of delivery. In one embodiment, one or more image capturing devices 120 may be installed in the cabin or trailer of a semi-truck to monitor the electronic device 104 while in transport. In one embodiment, the one or more image capturing devices 120 may be triggered or activated in response to detecting movement of the package or electronic device. For instance, in one embodiment, this may be aided by the use of a location tracking device and/or system such as, but not limited to, a global positioning system (GPS), a Global Navigation Satellite System (GLONASS), a BeiDou Navigation Satellite System (BDS), or another satellite based triangulation system. Further, a RFID device, NFC device, a Bluetooth device, a camera, or a device operable to detect motion and positioned proximate to an electronic device and/or a packaging of the electronic device may also be utilized to detect movement of the electronic device/package and/or determine the location of the electronic device/package. Additionally, in some embodiments, the one or more image capturing devices 120 installed in the trailer is operable to record images in response to the trailer door being opened. Further, the electronic device 104 may also contain a RFID device, a NFC device, a Bluetooth device, or another telecommunication device operable to establish communication with the processing device 130 and to provide the current location of the electronic device 104 to the processing device 130.

The one or more image capturing devices 120 may be operable to transmit images directly to the processing device 130 or may be operable to transmit images to one or more intermediate computing devices, which in turn transmits the images to the processing device 130. For example, the intermediate devices may include a computing device installed on the transport vehicle and/or a mobile computing device of the transport driver such as, but not limited to, a smartphone, a smartwatch, and/or a laptop. In some embodiments, the images and data may be transmitted to other intermediate computing devices prior to being received by the processing device 130. For example, in one embodiment, the images and data from a transport vehicle are first transmitted to a transport service provider 140 such as, but not limited to, UPS®, USPS®, and FedEx®. In turn, the transport service provider 140 may have one or more computing devices operable to communicate the images and data to the processing device 130. Still, in certain embodiments, one or more image capturing devices 120 may be located at a processing facility of the transport service provider 140 for providing images of the electronic device during the entire shipping process. Similar to the various locations 110, the transport service provider 140 may provide data to the processing device 130 including, but not limited to, images of the electronic device during processing or during transport, shipping information, driver information associated with transporting an electronic device, and loss information associated with the shipping or transport of one or more electronic devices. In some embodiments, the loss information associated with the shipping or transport of one or more electronic devices may include information on electronic devices that are not being processed at the facility 102.

In one embodiment, the processing device 130 is operable to use all the data and images received from the various locations 110, the facility 102, and the transport service provider 140 to perform a statistical loss analysis. For example, in one embodiment, the processing device 130 is operable to execute a statistical analysis algorithm using the amassed data from the various locations 110, transport service provider 140, and facility 102 to identify the amount of loss, the types of loss, or isolate where a loss most likely occurred. As an example, in one embodiment, the statistical analysis algorithm may determine common factors between each loss such as, but not limited to, return location, reverse logistics collection point, shipper/carrier, returns provider, return processing location, employee identity at each location, model, category of return (warranty return, upgrade return, sell back, etc.) in a given time period. The statistical analysis algorithm may then be operable to rank the common factors based on the occurrence (e.g., a common factor having the highest occurrence within the given time period, three common factors having the three highest occurrence within the given time period, etc.) in the given time period. For instance, in one embodiment, the statistical analysis algorithm may identify a particular person (e.g., a particular employee at a particular retail store or shipping facility) that is likely the cause of loss to ten electronic devices within the given time period, the processing device 130 then determines that the particular employee is the common factor associated with the loss of ten electronic devices. The processing device 130 may then generate a notice to the employee's supervisor requesting the supervisor to assign another employee to handle the electronic devices, generate an audit request of the employee's entity, as well as generate a request to take another course of action described herein. As such, the statistical analysis algorithm reduces or eliminates a potential source of loss by determining common factors that are attributed to multiple losses.

Additionally, in some embodiments, the statistical analysis algorithm may recommend follow-up action, generate alerts, or perform other actions based on the results of the statistical analysis. For example, in one embodiment, if the statistical analysis algorithm identifies a statistically significant loss associated with a particular person or place (e.g., when loss exceed a particular threshold), the processing device 130 is operable to recommend installing additional cameras and/or other security apparatuses at the particular location, replacing one or more employees at the particular location, hiring security personnel, and/or take other courses of action to reduce product loss. Further, the statistical algorithm may also trigger an audit to be performed on the particular person or place where the loss occurred. In one embodiment, the audit may retrieve and analyze additional historical data related to the particular person or place to identify trends for determining how long or often loss has been occurring. In one embodiment, the amount of historical data used may be user-specified. Alternatively, in some embodiments, the statistical analysis algorithm is operable to retrieve a preset amount of historical data in performing its analysis (e.g., the last 5 years). Still, in some embodiments, the amount of historical data may be retrieved in increments (e.g., 2 years at a time) until the statistical analysis algorithm identifies when loss most likely began.

Additionally, in one embodiment, the results of the statistical analysis may be used to generate a report card for a vendor or other service partners that can be used to demand credits from a vendor based on not meeting expectations specified in a service level agreement. The report card may also be used to assess a particular vendor's performance over time and to compare different performances by different vendors. As such, the report card may be utilized as a means move products from poorly performing vendors to vendors that have excellent report cards.

In some embodiments, the statistical analysis algorithm may also perform a trend analysis on the amassed data from the various sources to identify particular electronic devices or models that are prone to loss. For example, the statistical analysis algorithm may identify that the IPhone® has a loss rate of 15%, IPad® has a loss rate of 8%, Samsung Galaxy® phones have a loss rate of 6%, Hewlett Packard Laptops have a loss rate of 1%, and IBM Desktops have a loss rate of 0.009%. In some embodiments, the loss rate may be a combined loss rate that accounts for both stolen and misplaced items, as well as items that have been damaged. Alternatively, in some embodiments, the statistical analysis algorithm may break down the loss rate by confirmed stolen items, unconfirmed missing items, and damaged items.

Still, in some embodiments, the statistical analysis algorithm may dynamically identify or provide a real-time statistical rate loss analysis for a particular component of a particular model of an electronic device. More particularly, the statistical results may be tied into a pricing algorithm that dynamically updates the cost or fees associated with repairing or replacing a particular model. In some embodiments, the fees may be updated in real-time or near real-time based on the statistical analysis. For example, in one embodiment, the statistical analysis algorithm may identify that the screen of the latest IPhone® model has a loss rate of 15%. In addition, in one embodiment, the statistical analysis algorithm may identify that 7% of the 15% loss rate related to the screen of the latest IPhone® model occurs during transport. Additionally, in one embodiment, the statistical analysis algorithm may identify that 3% of the 7% loss rate occurring during transport corresponds to a particular transport company (e.g., by the UPS®). Further, in one embodiment, the statistical analysis algorithm may identify that of the 3%, 40% of the loss occurs at a particular processing facility (e.g., a main postal hub), half of which occurs during a particular shift. The statistical analysis algorithm may further identify particular employees that work during the particular shifts that most loss occurs. The statistical analysis algorithm is operable to dynamically update the foregoing rates over a period of time and is operable to analyze the foregoing rates, as well as the change in the foregoing rates to determine a loss trend. For example, if the statistical analysis algorithm determines that over a period of a month, a loss of products at a facility that is attributed to a particular employee increased by a rate that is greater than a threshold value, then the statistical analysis algorithm is operable to generate a notice to the employee's supervisor, generate a request to remove the employee, or generate another notice described herein to reduce product loss that is attributed to the employee.

In one embodiment, all this information and statistical analysis is made available or shared with the service providers, retailers, manufacturers, and shipping companies. For example, based on the above analysis, the shipping company may initiate an investigation that reveals that employees during the particular shift mishandle packages by tossing them into bins or vehicles. Additionally, based on the above analysis, Apple® may determine that the screen of the latest IPhone® model should be upgraded in future models. In one embodiment, the statistical analysis algorithm may accept as an input parameter a particular electronic device or model and generate the loss statistics related to that particular electronic device or model. The statistical analysis algorithm may also accept as an input parameter a particular location or company and generate the loss statistics related to that particular location or company.

Figure 8:
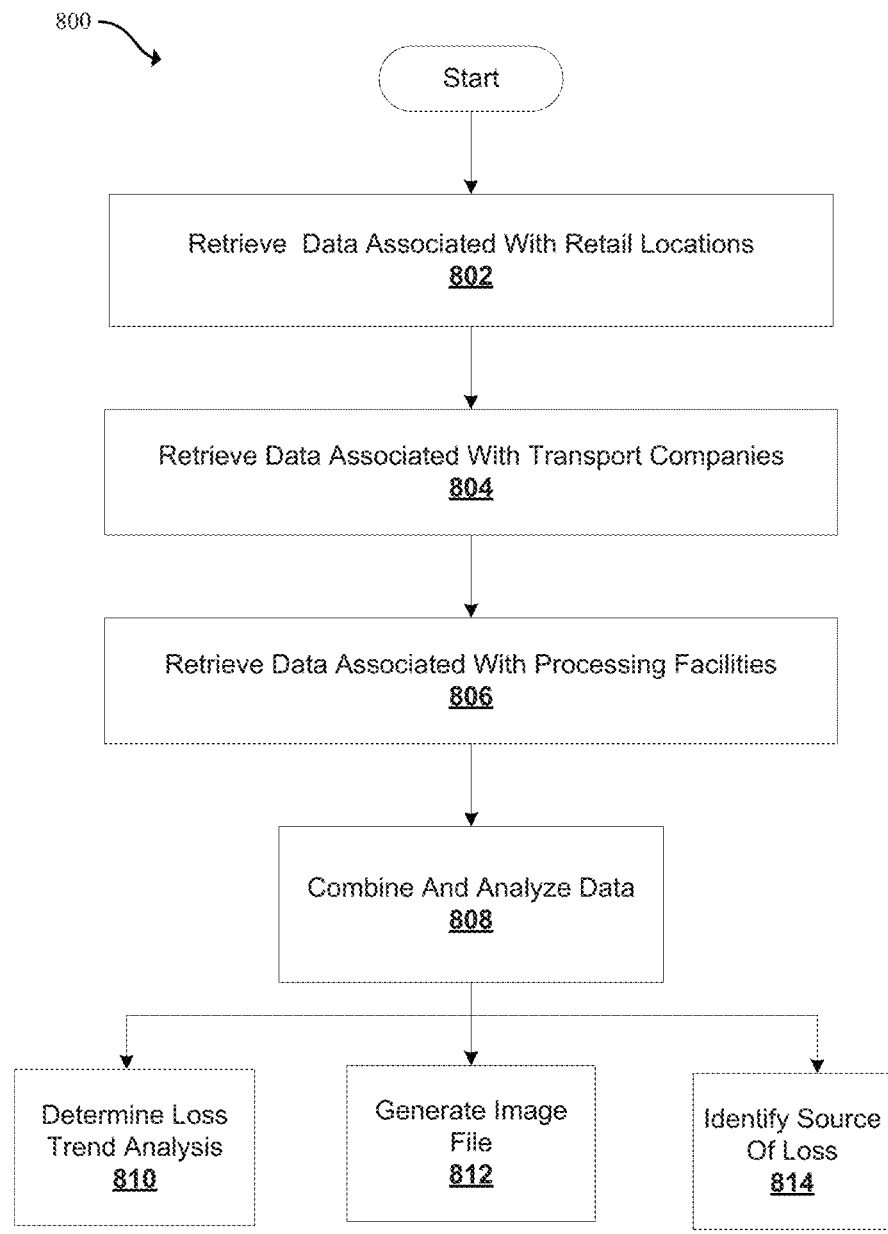
FIG. 8 is a flow diagram depicting another example of a loss tracking process in accordance with a disclosed embodiment.

FIG. 8 provides an example of a loss tracking process 800 in accordance with a disclosed embodiment. The process retrieves data obtained at different locations and analyzes said data to determine a loss trend analysis. For example, sometime after a customer of an electronic device returns said electronic device at a retail location, the electronic device is picked up by a carrier that transports the electronic device to a warehouse facility (central return facility). Employees at the central return facility process the electronic device to determine how to how to service said electronic device. The electronic device may be sent to one or more additional facilities, where additional servicing operations (e.g., refurbishing, flashing, updating software, deleting prior user data, installing user specified software etc.) are performed. The electronic device is then transported back to the central return facility, where the electronic device is loaded onto a transportation vehicle and is transported by a carrier to a designated location (e.g., location of a new customer or an entity as a warranty replacement). Data associated with each of the foregoing locations, the electronic device while the electronic device was stored at said locations, employees that handled the electronic device while the electronic device was stored at said locations, other electronic devices stored at said locations, as well as other quantifiable data associated with said locations are obtained by one or more image capturing devices 120 deployed at or proximate said locations. Said data are accessible by the processing device 130 and may be retrieved by the processing device 130 to perform one or more operations described herein.

In the depicted embodiment, the process begins at block 802 by retrieving data associated with the retail locations. As described above, this data may include, but is not limited to, images, loss data, inventory, and employee data. This data may be retrieved directly from a system located at a retail location or may be retrieved at a central database or other data storage systems. Similarly, at block 804, the process is operable to retrieve data from transport companies.

At block 806, the process retrieves the data from the processing facility. Using the amassed data from the retail locations, the transport companies, and the processing facility, the process at block 808 can perform one or more trend or statistical analysis or generate an image chain of custody file.

As an example, at block 810, the process includes a function for identifying an amount of loss based on the combined data. In some embodiments, this may be broken down by lost items, stolen items, and damaged items. Still, in some embodiments, the process is operable to determine a percentage of loss attributed to a location or facility, transport company, type of electronic device, model, and component. For example, in one embodiment, the process of using the amassed data may determine that the majority of loss occurred during transport. This determination may be based on verifying that the electronic devices are properly received by the transport company and not received by the destination location. In certain embodiments, the process may identify potential driver or drivers that are statistically likely to be the source of loss for one or more electronic devices. For example, if the loss associated with a particular driver exceeds a predetermined loss threshold, the process may send an audit alert or notification to a designated person to investigate further. The audit alert or notification may include one or more reasons that the source of loss was identified. Alternatively, in some embodiments, the process ranks the possible sources of loss. The ranking may include a probability percentage corresponding to each source, and may include details explaining the reasons behind the ranking or probability percentage.

In certain embodiments, at block 812, the process may include a function for generating an end-to-end video file or log file associated with one or more electronic devices. For example, in one embodiment, the process may receive a query for a particular electronic device or batch of electronic devices. In response to receiving the request, the process retrieves the images of the electronic device from the combined sources of data (e.g., retail location, transport company, process facility, etc.) and generates a complete image file of the requested electronic device that includes images of the electronic device as it sequentially progresses through it each of the locations. The complete image file may also include device information such as the IMEI, technical specification, shipping information, timestamps, signatures, owner information, reported issue associated with the electronic device, textual description or annotated notes related to the electronic device made during processing such as issues found, whether the issues were resolved, cost of repair, and other repair information such parts replaced. In one embodiment, the complete image file or a link to it is returned to the requester.

At block 814, the process may also include a function for identifying a source of loss for a specific electronic device. For example, in one embodiment, the process is operable to receive a unique identifier associated with a particular electronic device such as a serial number or IMEI number. As described above, the process can retrieve the complete image file and corresponding data corresponding to the particular electronic device. The process is operable to automatically analyze the data and images to determine anomalies such as time disparity, weight disparity, missing scans or signatures, image disparity such as missing images or a disparity between successive images, transport disparity such as change in travel route, disparity in description or condition of the electronic device, its components, or identifiers. In one embodiment, image disparity of a smartphone may be determined using a pixel by pixel comparison between two images where the smartphone is at approximately the same orientation in both images. Based on this analysis, if a discrepancy is found, the process returns the information associated with the discrepancy or other information identifying a likely source of loss for the specified electronic device.

Figure 9:
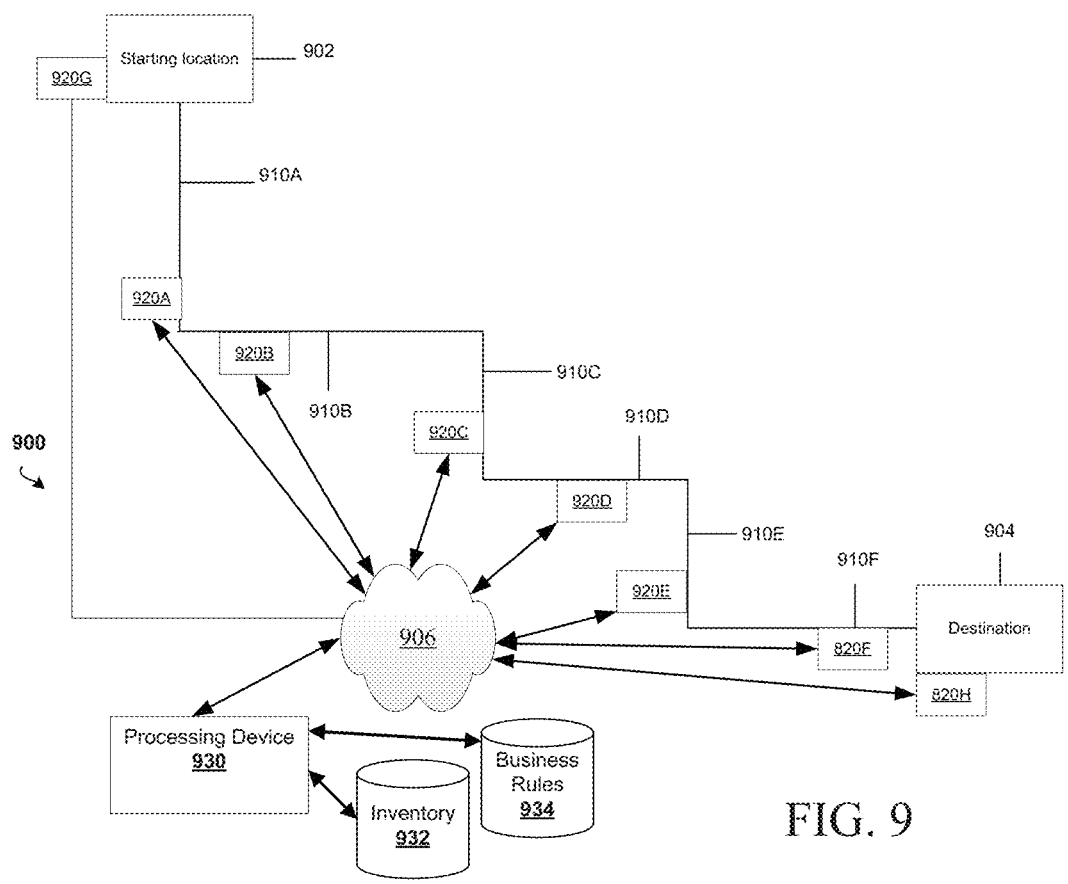
FIG. 9 provides an example of a system operable to investigate a lost product in accordance with a disclosed embodiment.

FIG. 9 provides an example of a system 900 operable to investigate a lost product in accordance with a disclosed embodiment. More particularly, the system is operable to identify a product route of a lost product, utilize one or more image capturing devices that are deployed along the product path, analyze records of the lost product along one or more sections of the product path as well as other relevant records described herein, and generate a lost product report. Starting location 902 and destination 904 may represent any location that defines a start of the product route and in and of the product route, respectively. For example, the starting location 902 may be a warehouse where the lost product was stored, a residential location of a user of the lost product, a distribution center, or another location where the lost product was stored prior to traveling on the product route. Similarly, the destination 904 may be a warehouse where the lost product was intended to be delivered to, a residential location of the user of the lost product, a destination distribution center or another location where the lost product was intended to the delivered to before said product was lost. In some embodiments, both the starting location 902 and the destination 904 may be locations within a facility (e.g., warehouse).

Product route 910A-910F includes a set of predetermined paths 910A, 910B, 910C, 910D, 910E, and 910F connecting the starting location 902 to the destination 904. Although FIG. 9 illustrates one product route 910A-910F having 6 product paths, the product route may vary based on a variety of factors including the distance between the starting location 902 and the destination 904, traffic, detours, as well as other factors that may affect the product route. Further, each product path may include one or more stops, such as an intermediary facility, storage, and transportation servicing station, at which the lost product may be inspected and a record of the lost product may be generated and transmitted to processing device 930.

In the depicted embodiment, the processing device 930 is operable to perform operations performed by the processing devices described herein and illustrated in FIGS. 1-9. The system includes the processing device 930 and an inventory database 932 containing end-to-end records of electronic devices tracked by the system 900. As defined herein, end-to-end records of electronic devices include substantially all records associated with the electronic devices starting from a starting location, such as the starting location 902 to a destination, such as the destination 904. Examples of end-to-end records of an electronic device includes an identification of the electronic device, a type of the electronic device, customer information regarding the customer of the electronic device, vendor information regarding the vendor of the electronic device, hardware/software components installed on the electronic device, the current monetary value of the electronic device, the insured value of the electronic device, information regarding the starting location 902 and the destination 904, the product route 910A-910F of the electronic device, one or more time stamps of the electronic device captured by image capturing devices 920A-920F, up-to-date condition of the electronic device as the electronic device travels along the product route 910A-910F, identities of employees that directly handled the electronic device along the product route 910A-910F, identities of employees within a proximity of the product route 910A-910F while the electronic device was in route to the destination 904, identities of one or more transportation vehicles and logistic companies used to transport the electronic device, as well as other records of the electronic device as the electronic device as the electronic device is transported from the starting location to the destination 204. The inventory database 932 may also include other information stored in the inventory database 132 described herein.

Business rules database 934 includes business rules for determining the product route 910A-910F of the electronic device, determining a last known location of the electronic device, generating a range of interest along the product route 910A-910F, along which the electronic device may have been lost, analyzing records of the electronic device stored in the inventory database 932 or another database, analyzing records of other electronic devices that were lost approximately along the range of interest, and generating a lost product report of the electronic device. The foregoing business rules as well as additional business rules for investigating a lost product are described in the following paragraphs. Further, the business rules database 934 may also include business rules stored in the business rules database 134 described herein.

The system also includes image capturing devices 920A-920H, where each image capturing device 920A, 920B, 920C, 920D, 920E, and 920F is deployed along a corresponding product path 910A, 910B, 910C, 910D, 910E, and 910F along the product route 910A-910F. These image capturing devices 920A-920H may be deployed at an intermediary stop along the product route 910A-910F, or may be deployed at other predetermined locations along the product route 920A-920H. In the embodiments where the starting location 902 and the destination 904 are both locations within a facility, the image capturing devices 920A-920F may be deployed along the product paths 910A, 910B, 910C, 910D, 910E, and 910F that connect the starting location 902 to the destination 904. Further, image capturing device 920G is deployed at the starting location 902 and image capturing device 920H is deployed at the destination 904. The image capturing devices 920A-920H are operable to perform operations performed by the image capturing devices 120 described herein to monitor the status of the electronic device from the starting location 902, along the product route 910A-910F, to the destination 904, and to generate time stamps indicative of a location of the electronic device and an approximate time the electronic device is at said location. Each of the image capturing devices 920A-920H is communicatively connected to the processing device 930 via a network 906 and is operable to provide the processing device 930 with a real-time status report of the electronic device, thereby notifying the processing device 930 the status of the electronic device.

In some embodiments, the processing device 930 is operable to calculate an approximate time the electronic device would reach each image capturing device 920A-920F that is deployed along the product route 910A-910F. For example, if the processing device 930 receives a notification that the electronic device left the starting location 902 at 12:00 PM, and is in route to the destination 904 along the product route 910A-910F, the processing device 930 determines that the electronic device would travel for approximately 10 minutes along each product path of the product route 910A-910F, and determines that under ideal circumstances, the electronic device should reach the destination 904 and would be scanned by the image capturing device 920H at approximately 1:10 PM. The processing device 930 may identify the electronic device as a lost product if the electronic device does not reach each image capturing device 920A-920H within the scheduled time to reach said image capturing device plus a threshold to account for unexpected delays. Continuing with the foregoing example, and assuming that under ideal circumstances, the electronic device would reach each successive image capturing device 920A-920H in 10 minutes and that the threshold is 5 minutes, the processing device 930 would identify the electronic device as a lost product if the electronic device does not reach the image capturing device 920A by 12:15, the image capturing device 920B within 15 minutes after reaching the image capturing device 920A, and so on until the electronic device reaches the destination 904.

Assuming that the processing device 930 received a notification from the imaging device 920C but did not receive a notification from the imaging device 920D, within the allocated time plus the threshold, then the electronic device is identified as a lost product. The processing device 930 then determines the entire product route of the lost product from the starting location 902 to the destination 904. The product route includes paths taken 910A-910C the lost product traveled on from the starting location 902 to the last known location of the lost product. The product route may also include a predetermined set of paths from the last known location to the destination 904 and/or one or more alternative set of paths from the last known location to the destination 904.

The processing device 930 is further operable to generate a range of interest along the product route 910A-910H, where the range of interest includes the last known location of the lost product. The distance of the range may vary based on one or more factors such as the total distance of the product route 910A-910H, the distance between each successive image capturing device along the product route 910A-910H, identifications of individuals that directly handled the lost product credentials of said individuals, identifications of transportation companies responsible for transporting the lost product, a history of product loss by said transportation companies, records of other lost products that were lost approximately along the range of interest, as well as other factors that may define or modify the range of interest.

The processing device 930 analyzes relevant records of the lost product along the range of interest to estimate a location and a time the lost product was lost. The processing device also generates a lost product report that includes the estimated location of the lost product, the estimated time the lost product was lost, and an assessment of the lost product. The assessment may include additional information such as individuals and companies that handled the lost product, the credentials and records of said individuals and companies, as well as other quantifiable information related to the lost product. The report may be sent in real-time to one or more parties, such as the not limited to the companies responsible for transporting the lost product, employees at the destination 904, employees at the starting location 902, employees along the product route 910A-910H, as well as other individuals directly or indirectly involved with transporting the lost product. In some embodiments, the processing device 930 updates the inventory database 932 in real-time with records of the lost product as the processing device 930 receives data indicative of the records of said lost product from the image capturing devices 920A-920H.

The network 906 can include, for example, any one or more of a cellular network, a satellite network, a personal area network (PAN), a local area network (LAN), a wide area network (WAN), a broadband network (BBN), the Internet, and the like. Further, the network 106 can include, but is not limited to, any one or more of the following network topologies, including a bus network, a star network, a ring network, a mesh network, a star-bus network, tree or hierarchical network, or similar network architecture. The network 906 may be implemented using different protocols of the internet protocol suite such as TCP/IP. The network 906 includes one or more interfaces for data transfer. In some embodiments, the network 906 includes a wired or wireless networking device (not shown) operable to facilitate communication between the processing device 930, the inventory database 932, the business rules database 934, and the image capturing devices 920A-920H. Examples of the networking device include, but are not limited to, wired and wireless routers, wired and wireless modems, access points, as well as other types of suitable networking devices described herein.

As demonstrated above, the disclosed embodiments are capable of providing an end-to-end visual tracking and loss prevention analysis starting from the point that a customer, manufacturer, client, or consumer relinquishes an electronic device for shipping, repair, exchange, warranty request, and/or other service requests. Additionally, the disclosed embodiments are capable of cross correlating loss data from multiple sources including internal and external (third party) data such as from a telecommunications service provider, retailers, and transport companies to identify loss or perform trend analysis.

It should be apparent from the foregoing that embodiments of several inventions having significant advantages over current technology have been provided. For example, advantages of the disclosed embodiments when compared with all current methods include providing visual tracking during processing of an electronic device for, among other things, repairs, exchanges, warranty, refurbishment, and value assessment. As stated above, this allows an electronic device to be visually tracked, as opposed to being tracked merely by location, and provides granularity into the repair, exchange, and/or warranty process. In addition, the disclosed embodiments may be used to identify and/or provide visual proof regarding loss to an electronic device that may have been cause during processing.

While the embodiments are shown in only a few forms, the embodiments are not limited but are susceptible to various changes and modifications without departing from the spirit thereof. For example, in addition to the disclosed methods and systems, the disclosed embodiments may also be embodied in a computer program product, comprising a non-transitory computer usable medium having a computer readable program code embodied therein.

Further, the steps or blocks of the methods described herein may be carried out in any suitable order, or simultaneously where appropriate. Thus, the scope of the claims should not necessarily be limited by the above description, which is merely provided as examples to allow one of ordinary skill in the art to practice the appended claims.

Moreover, while the appended claims recite specific combinations of features of the disclosed embodiments, other combinations of the claims may include one or more of the disclosed features combine in any number of combinations. In other words, it is intended that the disclosed embodiments support amendments to the appended claims or new claims that combine or omit various steps or features of the disclosed embodiments in any combination other than those specifically recited in the current appended claims. For example, although in the appended claims, a particular claim may depend on just one preceding claim, the disclosed embodiments are not limited in that sense and that the dependent claim may depend on various other combinations of the appended claims.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity. In addition, as used herein, the singular forms "a", "an" and "the" are intended to include the plural forms as well, unless the context clearly indicates otherwise.

Additionally, unless otherwise specified, any use of any form of the terms "connect," "engage," "couple," "attach," "communicate," or any other term describing an interaction between elements is not meant to limit the interaction to direct interaction between the elements and may also include indirect interaction between the elements described. In contrast, when an element is referred to as being "directly" connected, coupled, communicates, or attached to another element, no intervening elements are present.

The invention claimed is:

1. A method to process a product return request, the method comprising:

receiving instructions to process a first product return request for an electronic device;

performing an image analysis on the electronic device;

obtaining business rules governing the first product return request; wherein the business rules governing the first product return request includes a weighting algorithm that is operable to:

provide different weight scales to weight damages to different components of the electronic device;

for each component of the different components, determine a score based on a weight on a weight scale of the different weight scales that is associated with the component;

determine that the first product return request should be accepted in response to a determination that the score is within an acceptable range; and determine that the first product return request should not be accepted in response to a determination that the score is not within the acceptable range;

determining whether to accept the first product return request based on the business rules and the image analysis associated with the electronic device;

providing a notification to a customer comprising the ability to view a processing of the electronic device;

allowing the customer to view the processing of the electronic device;

allowing the customer to remotely capture an image of the electronic device during the processing by controlling an image capturing process remotely;

communicating by an operator or a processing device with the customer during the viewing of the electronic device by the customer; and transmitting an electronic message to the customer indicating whether the first product return request has been accepted, and wherein the electronic message includes reasons why the first product return request is not accepted under the first product return request in response to a determination that the first product return request should not be accepted; wherein the electronic message includes an option for retrieving at least one of detailed images and video of the electronic device depicting a device condition of the electronic device upon opening of a package in which the electronic device is received in.

2. The method of claim 1, wherein the business rules governing the first product return request define a set of conditions associated with the electronic device, wherein at least one condition of the set of conditions varies over a period of time, and wherein whether to accept the first product return comprises determining a current value of each condition of the set of conditions.

3. The method of claim 2, wherein the set of conditions include one or more device conditions of the electronic device.

4. The method of claim 3, wherein the set of conditions include one or more market conditions for the electronic device.

5. The method of claim 4, wherein the set of conditions include one or more vendor specified conditions from a vendor of the electronic device.

6. The method of claim 1, further comprising determining, based on the image analysis, one or more alternative product return requests available for the electronic device; and obtaining business rules governing the one or more alternative product return requests available for the electronic device.

7. The method of claim 6, wherein the first product return request and the one or more alternative product return requests comprise a request to return the electronic device for a full refund, a request to return the electronic device for a partial refund, a request to exchange the electronic device for another electronic device, a request to repair the electronic device, a request to trade-in the electronic device for in-store credit, and a request to dispose the electronic device.

8. The method of claim 1, further comprising:
capturing images of a condition of a package in which the electronic device is received in when the package is received; and
capturing images of the package being opened and a device condition of the electronic device upon opening of the package.

9. The method of claim 8, wherein the images includes video and still images.

10. The method of claim 9, further comprising capturing detailed images of the electronic device for performing the image analysis, and comparing the detailed images of the electronic device to stock images of the electronic device.

11. The method of claim 10, further comprising automatically determining a make and model of the electronic device by identifying an International Mobile Station Equipment Identity (IMEI) for retrieving the stock images of the electronic device.

12. The method of claim 11, further comprising storing the detailed images of the electronic device in a database management system and configuring the database management system to be searchable by the IMEI of the electronic device for retrieving the detailed images of the electronic device.

13. A system for processing product return requests, the system comprising:
at least one remote system operable to control an image capturing device remotely;
the image capturing device operable to capture images of an electronic device;
at least one image storing device operable to store stock images of the electronic device;
a storage unit storing business rules governing a warranty plan of a service provider associated with the electronic device; wherein the business rules governing the warranty plan define a set of conditions associated with the electronic device, the set of conditions comprising a device condition of the electronic device, a market condition of the electronic device, a return plan of the electronic device, and a vendor condition of the electronic device, wherein at least one condition of the set of conditions varies over a period of time, and wherein whether to accept the electronic device under the warranty plan comprises determining a current value of the set of conditions; wherein the set of conditions include a real-time inventory corresponding to a make and model of the electronic device possessed by the service provider; and
at least one instruction processing device operable to perform image analysis on the electronic device, obtain a set of the business rules governing the warranty plan of the service provider associated with the electronic device based on the images of the electronic device, and determine whether the electronic device is accepted under the warranty plan based on the business rules and the image analysis associated with the electronic device;
wherein the instruction processing device is further operable to provide a notification to a customer comprising the ability to view a processing of the electronic device; wherein the notification allows the customer to view the processing of the electronic device; and
wherein the instruction processing device is further operable to communicate with the customer during the viewing of the electronic device by the customer; and transmit an electronic message to the customer indicating whether the electronic device is accepted under the warranty plan, wherein the electronic message includes reasons why the electronic device is not accepted under the warranty plan in response to a determination that the electronic device should not be accepted; wherein the electronic message includes an option for retrieving at least one of detailed images and video of the electronic device depicting a device condition of the electronic device upon opening of a package in which the electronic device is received in.

14. The system of claim 13, wherein the at least one image capturing device is further operable to capture images of a condition of a package in which the electronic device is received in when the package is received.

15. A computer program product, comprising a non-transitory computer usable medium having a computer readable program code embodied therein, said computer readable program code adapted to be executed to:
perform image analysis on an electronic device;
retrieve business rules governing a warranty plan of a service provider associated with the electronic device; wherein the business rules governing the warranty plan define a set of conditions associated with the electronic device, the set of conditions comprising a device condition of the electronic device, a market condition of the electronic device, a return plan of the electronic device, and a vendor condition of the electronic device, wherein at least one condition of the set of conditions varies over a period of time, and wherein whether to accept the electronic device under the warranty plan comprises determining a current value the set of conditions; wherein the set of conditions include a real-time inventory corresponding to a make and model of the electronic device possessed by the service provider;

update the business rules governing the warranty plan of the service provider based on a set of conditions;

determine whether the electronic device is accepted under the warranty plan based on the business rules and the image analysis associated with the electronic device provide a notification to a customer comprising the ability to view a processing of the electronic device;

allow the customer to view the processing of the electronic device;

allow the customer to remotely capture an image of the electronic device during the processing by controlling an image capturing process remotely; and communicate by an operator or a processing device with the customer during the viewing of the electronic device by the customer; and transmitting an electronic message to the customer indicating whether the electronic device is accepted under the warranty plan, and wherein the electronic message includes reasons why the electronic device is not accepted under the warranty plan in response to a determination that the electronic device should not be accepted; wherein the electronic message includes an option for retrieving at least one of detailed images and video of the electronic device depicting a device condition of the electronic device upon opening of a package in which the electronic device is received in.

* * * * *